United States Patent
Stanojevic et al.

(10) Patent No.: US 8,472,597 B2
(45) Date of Patent: Jun. 25, 2013

(54) AUTOMATIC USE OF BEHAVIORAL INFORMATION FOR PROMOTIONAL PURPOSES IN COMMUNICATIONS SYSTEM

(75) Inventors: Oliver Stanojevic, Rödeby (SE); Laszlo Farkas, Budapest (HU); Mate Szalay, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 228 days.

(21) Appl. No.: 12/955,108

(22) Filed: Nov. 29, 2010

(65) Prior Publication Data
US 2011/0129076 A1   Jun. 2, 2011

Related U.S. Application Data

(60) Provisional application No. 61/265,535, filed on Dec. 1, 2009.

(51) Int. Cl.
*H04M 15/00* (2006.01)

(52) U.S. Cl.
USPC ............. 379/114.1; 379/114.12; 379/121.02; 379/121.04; 705/14.1; 705/14.13; 705/14.17

(58) Field of Classification Search
USPC ................. 379/111, 112.01, 112.05, 112.06, 379/114.01, 114.05, 114.1, 114.12, 114.18, 379/121.01, 121.02, 121.04, 133, 134; 455/405, 455/406, 407, 408; 705/14.1, 14.13, 14.17, 705/14.2, 14.27, 14.28, 14.32, 14.36
See application file for complete search history.

(56) References Cited

U.S. PATENT DOCUMENTS

| | | | | |
|---|---|---|---|---|
| 5,991,376 | A | * | 11/1999 | Hennessy et al. .......... 379/114.1 |
| 6,125,173 | A | * | 9/2000 | Jagadish et al. ........... 379/114.1 |
| 6,298,125 | B1 | * | 10/2001 | Goldberg et al. .......... 379/114.1 |
| 6,804,337 | B1 | * | 10/2004 | Anderson et al. ........ 379/114.06 |

(Continued)

FOREIGN PATENT DOCUMENTS

| | | |
|---|---|---|
| GB | 2 367 445 A | 3/2002 |
| GB | 2 408 816 A | 8/2005 |

(Continued)

OTHER PUBLICATIONS

International Search Report and Written Opinion mailed May 5, 2011 in corresponding PCT Application No. PCT/SE2010/051312.

(Continued)

*Primary Examiner* — Binh Tieu
(74) *Attorney, Agent, or Firm* — Nixon & Vanderhye, P.C.

(57) ABSTRACT

A node (22) of a communications system is configured use behavioral information (26) regarding a customer/subscriber's communication usage to automatically perform a promotional activity (28) with respect to communication usages of the customer/subscriber with another customer/subscriber. In an example implementation, the node (22) comprises electronic circuitry (38) configured to use the behavioral information (26) regarding the customer/subscriber's communication usage to automatically perform the promotional activity (28) with respect to the communication usages of the customer/subscriber with the another customer/subscriber. In its various embodiments, the promotional activity (28) comprises at least one of a financial discount activity; a new access activity; a quality of service change activity; and, an advance recharge activity. The behavioral information (26) may reflect both symmetry of connection (26-1) of the customer/subscriber with the another customer/subscriber; and community similarity (26-2) of the customer/subscriber and another customer/subscriber or other usage pattern.

44 Claims, 24 Drawing Sheets

U.S. PATENT DOCUMENTS

| | | | |
|---|---|---|---|
| 7,260,193 B2 | 8/2007 | Zackrisson et al. | |
| 7,606,354 B2* | 10/2009 | Meincke | 379/114.03 |
| 7,747,461 B2* | 6/2010 | Sheth et al. | 705/14.32 |
| 7,986,935 B1* | 7/2011 | D'Souza et al. | 455/406 |
| 8,068,809 B2* | 11/2011 | Lestreus | 455/405 |
| 8,073,117 B2* | 12/2011 | O'Neil et al. | 379/114.05 |
| 2002/0126813 A1* | 9/2002 | Partovi et al. | 379/114.12 |
| 2004/0097245 A1* | 5/2004 | Sheth et al. | 455/466 |
| 2006/0058010 A1* | 3/2006 | Williams et al. | 455/414.1 |
| 2010/0080370 A1* | 4/2010 | Fiorentino | 379/114.03 |
| 2010/0228616 A1* | 9/2010 | Sheth et al. | 705/14.24 |

FOREIGN PATENT DOCUMENTS

| | | | |
|---|---|---|---|
| WO | 98/39911 | A1 | 11/1998 |
| WO | 03/073236 | A2 | 4/2003 |
| WO | 03/101123 | A2 | 4/2003 |
| WO | 2009/082278 | A1 | 2/2009 |

OTHER PUBLICATIONS

Hidalgo et al, (2008), "The Dynamics of a Mobile Phone Network", Physica A, pp. 378.

Onnela et al, (2007), *Structure and Tie Strengths in Mobile Communication Networks*, PNAS, 7332-7336, vol. 104, No. 18.

Palla et al, (2005), *Uncovering the Overlapping Community Structure of Complex Networks in Nature and Society*, Nature 435, pp. 814-818.

Ravasz et al, (2002), *Hierarchical Organization of Modularity in Metabolic Networks*, Science 297, 1551-1555.

Yip, A.M. and Horvath, S. (2007), *Gene Network Interconnectedness and the Generalized Topological Overlap Measure* BMC Bioinformatics, http://www.biomedcentral.com/1471-2105/8/22.

* cited by examiner

| WEIGHTED DIRECTED CONNECTIONS BETWEEN TWO SUBSCRIBERS | SYMMETRY VALUE OF THE CONNECTION |
|---|---|
| A —3→ B | 0 |
| A —5→ ←5— B | 1 |
| A —1→ ←9— B | 0.2 |

| CALL CASE | DISCOUNT |
|---|---|
| A -> B | 50 |
| A -> C | 40 |
| A -> D | 30 |
| A -> E | 20 |
| A -> F | 10 |

| FaF INDICATOR | QUALIFYING AMOUNT (EUR) | DISCOUNT |
|---|---|---|
| 1 | 50+ | 50 |
| 2 | 40 - 49 | 40 |
| 3 | 30 - 39 | 30 |
| 4 | 20 - 29 | 20 |
| 5 | 10 -19 | 10 |

*Fig. 14*

| FaF RANK | SUBSCRIBER | QUALIFYING AMOUNT (EUR) | DISCOUNT |
|---|---|---|---|
| 1 | B, H, S | 50+ | 50 |
| 2 | D, L | 40 - 49 | 40 |
| 3 | C, W, U, P | 30 - 39 | 30 |
| 4 | E, Q, R, I, T | 20 - 29 | 20 |
| 5 | F,Y,V,O,G,N,M | 10 -19 | 10 |

*Fig. 15*

AUTOMATIC USE OF BEHAVIORAL INFORMATION FOR PROMOTIONAL PURPOSES IN COMMUNICATIONS SYSTEM

This application claims the priority and benefit of U.S. Provisional Patent Application 61/265,535 filed on Dec. 1, 2010, which is incorporated herein by reference in its entirety.

TECHNICAL FIELD

This invention pertains to communications, and particularly to methods and apparatus for managing accounts for subscribers of communications services.

BACKGROUND

Communications companies (e.g., telecommunications operators and/or service providers) financial charge customers/subscribers using various mechanisms such as account billing in return for services rendered to the customers/subscribers by the communication companies. The revenue realized by communications companies upon customer payment defrays, among other things, the initial capital outlay and maintenance of the network infrastructure, as well as day-to-day operating costs.

For sake of management and financial administration the communications company (e.g., "operator") typically maintains or has access to an electronic accounting system, e.g., a charging system. The electronic accounting system can comprise one or more nodes or service points included in or connected to an operator's network (e.g., a core network, for example). The electronic accounting system typically maintains information in the form of an accounting ledger, subscriber profile or the like for each customer/subscriber. Various features or rules can be associated with a customer/subscriber for determining or reflecting utilization privileges of the customer/subscriber for the communications network and the financial billing considerations which are associated with those privileges. These features or rules can be pre-arranged, e.g., by contract, between the operator and the customer/subscriber.

Some features or rules affecting service utilization and billing now popular with customer/subscriber are those which involve social communities of customers/subscribers. One of these features is the fleet service, where the operator gives discounts to the calls between subscribers inside a fleet. Another popular social community feature is the "family and friends" service, which allows a customer/subscriber to select or otherwise mark a set of other customers/subscribers with whom communications services are financially charged at a reduced or more favorable rate than ordinarily would be the case.

The "Family and Friends" (FaF) feature is thus an existing feature of some operator charging systems which enables discounting of voice and other traffic (e.g., short message service [SMS]) based on list of favorite numbers and number series. Example embodiments of the Family and Friends feature are described in U.S. Pat. No. 7,260,193, incorporated herein by reference in its entirety. The Family and Friends feature allows the operator to define lists of numbers for which specific (favored) tariffs will be associated with a particular customer/subscriber. The lists of Family and Friends numbers can be connected to a subscription or to an account and thus make it possible to build further and advanced discounting logic. See, e.g., Hidalgo and Rodriguez (2008), The Dynamics of a Mobile Phone Network, Physica A, 378, incorporated herein by reference in its entirety.

In most implementations the Family and Friends feature is rather inflexible and static. For example, a customer/subscriber typically must opt for participation in the Family and Friends feature, e.g., the customer/subscriber must affirmatively declare an interest in the service. Moreover, the Family and Friends list associated with the customer/subscriber remains essentially static and does not reflect any changes in social behavior and/or social preferences of the customer/subscriber. By "static" is meant that the list of Family and Friends participants cannot be changed without human intervention, e.g., intervention in the form of interaction with either the customer/subscriber or an employee of the operator. For example, in some systems a customer/subscriber must call or contact the operator if the customer/subscriber wishes to change his/her list of Family and Friends participants, e.g., using a customer care (CC) or Interactive Voice Response (IVR) system/office of the operator.

SUMMARY

In some of its various aspects, the technology disclosed herein concerns use of behavioral information regarding a customer/subscriber's communication usage to automatically perform a promotional activity with respect to communication usages of the customer/subscriber with another customer/subscriber (the "other" customer/subscriber), and particularly to a node configured for such use of behavioral information. In an example implementation, the node comprises electronic circuitry configured to use the behavioral information regarding the customer/subscriber's communication usage to automatically perform the promotional activity with respect to the communication usages of the customer/subscriber with the other customer/subscriber. In its various embodiments, the promotional activity comprises at least one of a financial discount activity; a new access activity; a quality of service change activity; and an advance recharge activity. The financial discount activity may comprise, for example, one or both of providing a financial discount and modifying a financial discount.

In some example embodiments, the node performs the promotional activity depending on various factors. For example, in some example embodiments and modes the financial discount performs the promotional activity depending on whether or not the behavioral information indicates that the customer/subscriber and the other customer/subscriber initiate connections to each other substantially equally. In some example embodiments the node performs the promotional activity depending on whether or not the behavioral information indicates that the customer/subscriber and the other customer/subscriber belong to a same community. In some example embodiments the node is configured to use the behavioral information to predict a future persistence of communications between the customer/subscriber and the other customer/subscriber. In some example embodiments the node is configured to use the behavioral information to predict a future persistence of communications between the customer/subscriber and the other customer/subscriber and to encourage certain behavior.

In some example embodiments the behavioral information reflects both symmetry of connection of the customer/subscriber with the other customer/subscriber and community similarity of the customer/subscriber and another customer/subscriber. In such example embodiments the node may be configured to determine a promotional value for communication usages of the customer/subscriber relative to the other customer/subscriber, the promotional value ($D_B$) being determined according to the expression $D_B = (S_{AB} + C_{AB}) * W'_{AB}$, wherein $S_{AB}$ is a symmetry of connection value of the customer/subscriber with another customer/subscriber; $C_{AB}$ is a community similarity value of the customer/subscriber and another customer/subscriber; and $W'_{AB}$ is a normalized value of a number of connections initiated by the customer/subscriber to the other customer/subscriber.

In example embodiments, the community similarity may depend on a number of common neighbors of the customer/subscriber and the other customer/subscriber and the number of neighbors of the customer/subscriber. For example, the symmetry of connection value $S_{AB}$ may be determined by the expression $S_{AB}=\text{minimum } (W_{AB}, W_{BA})/(W_{AB}+W_{BA})$, wherein $W_{AB}$ is the number of connections initiated by the customer/subscriber to the other customer/subscriber and $W_{BA}$ is a number of connections initiated by the other customer/subscriber to the customer/subscriber.

In example embodiments, the community similarity value may be determined by the expression $C_{AB}=(1+N_{AB})/N_A$, where $N_{AB}$ is a number of common neighbors of the customer/subscriber and the other customer/subscriber and $N_A$ is the number of neighbors of the customer/subscriber.

In the example embodiment, however the promotional value is determined (e.g., according to an expression such as $D_B=(S_{AB}+C_{AB})*W'_{AB}$ or any other technique), the node may be configured to re-evaluate the promotional value periodically, and upon each re-evaluation the node may cause the customer/subscriber to be informed of results of the re-evaluation.

In some example embodiments, the promotional activity comprises using the behavioral information to modify a preferred list of customers/subscribers for whom the customer/subscriber is afforded a preferential benefit or credit, e.g., a preferential financial rate.

In some example embodiments, the preferred list may be configured to comprise plural levels of preference, each preference level being associated with a corresponding level of promotional credit or promotional benefit (e.g., financial discount), with the node being configured to use behavioral information regarding the customer/subscriber's communication with another customer/subscriber to automatically change a preference level on the preferred list for the other customer/subscriber.

In some example embodiments, the preferred list is configured to accommodate plural other customers/subscribers at at least one preference level.

In some example embodiments the node maintains the preferred list by allowing the other customer/subscriber to remain at a current preference level on the preferred list for a first period of time; and upon expiration of the first period of time and selectively demoting or promoting the other customer/subscriber to another preference level.

In some example embodiments the node maintains the preferred list by providing a notification to the customer/subscriber and/or the other customer/subscriber when the amount of the communication usage between the customer/subscriber and the other customer/subscriber approaches a threshold value associated with a particular preference level.

In some of its various aspects, the technology disclosed herein concerns methods of operating a communications system. Such methods generally comprise obtaining (e.g., periodically) behavioral information regarding a customer/subscriber's communication usage and using the behavioral information to automatically perform a promotional activity with respect to communication usages of the customer/subscriber with another customer/subscriber. In some example implementations such methods further comprise using electronic circuitry to automatically perform the promotional activity with respect to the communication usages of the customer/subscriber with the other customer/subscriber. In some example modes the promotional activity comprises at least one of a financial discount activity; a new access activity; a quality of service change activity; and an advance recharge activity. The financial discount activity may comprise, for example, one or both of providing a financial discount and modifying a financial discount.

In some example modes the method further comprises performing the promotional activity depending on various factors. For example, in some example modes the method further comprises performing the promotional activity depending on whether or not the behavioral information indicates that the customer/subscriber and the other customer/subscriber initiate connections to each other substantially equally. In some example modes the method further comprises performing the promotional activity depending on whether or not the behavioral information indicates that the customer/subscriber and the other customer/subscriber belong to a same community. In some example modes the method further comprises using the behavioral information to predict a future persistence of communications between the customer/subscriber and the other customer/subscriber.

In some example modes the behavioral information reflects both symmetry of connection of the customer/subscriber with the other customer/subscribe and community similarity of the customer/subscriber and another customer/subscriber. For example, in some example modes the method further comprises determining a promotional value $D_B$ for communication usages of the customer/subscriber relative to the other customer/subscriber, the promotional value $D_B$ being determined according, to the expression $D_B=(S_{AB}+C_{AB})*W'_{AB}$, wherein $S_{AB}$ is a symmetry of connection value of the customer/subscriber with another customer/subscriber; $C_{AB}$ is a community similarity value of the customer/subscriber and another customer/subscriber; and $W'_{AB}$ is a normalized value of a number of connections initiated by the customer/subscriber to the other customer/subscriber.

In some example modes of the method, the community similarity may depend on a number of common neighbors of the customer/subscriber and the other customer/subscriber and the number of neighbors of the customer/subscriber. For example, the symmetry of connection value $S_{AB}$ may be determined by the expression $S_{AB}=\text{minimum }(W_{AB},W_{BA})/(W_{AB}+W_{BA})$, wherein $W_{AB}$ is the number of connections initiated by the customer/subscriber to the other customer/subscriber and $W_{BA}$ is a number of connections initiated by the other customer/subscriber to the customer/subscriber.

In some example modes the symmetry of connection value $S_{AB}$ is determined by the expression $S_{AB}=\text{minimum }(W_{AB},W_{BA})/(W_{AB}+W_{BA})$, wherein $W_{AB}$ is the number of connections initiated by the customer/subscriber to the other customer/subscriber and $W_{BA}$ is a number of connections initiated by the other customer/subscriber to the customer/subscriber.

In some example modes, the method further comprises determining the community similarity value by the expression $C_{AB}=(1+N_{AB})/N_A$, where $N_{AB}$ is a number of common neighbors of the customer/subscriber and the other customer/subscriber and $N_A$ is the number of neighbors of the customer/subscriber.

In some example modes, however the promotional value D is determined (e.g., according to an expression such as $D_B=(S_{AB}+C_{AB})*W'_{AB}$ or any other technique), the method may further comprise re-evaluating the promotional value D periodically, and upon each re-evaluation informing the customer/subscriber of results of the re-evaluation.

In some example modes the method further comprises performing the promotional activity by using the behavioral information to modify a preferred list of customers/subscribers for whom the customer/subscriber is afforded a preferential credit or benefit, e.g., a preferential financial rate.

In some example modes, the preferred list is configured to comprise plural levels of preference, each preference level being associated with a corresponding level of credit or benefit (e.g., financial discount), and example modes of the method further comprise using the behavioral information regarding the customer/subscriber's communication with another customer/subscriber to automatically change a preference level on the preferred list for the other customer/subscriber.

In some example modes, the method further comprises structuring the preferred list to accommodate plural other customers/subscribers at at least one preference level.

In some example modes the method further comprises allowing the other customer/subscriber to remain at a current preference level on the preferred list for a first period of time; and, upon expiration of the first period of time, selectively demoting or promoting the other customer/subscriber to another preference level.

In some example modes the method further comprises providing a notification to the customer/subscriber and/or the other customer/subscriber when the amount of the communication usage between the customer/subscriber and the other customer/subscriber approaches a threshold value associated with a particular preference level.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 14 is a chart showing a multi-level preferred list of customers/subscribers including an example population of data.

FIG. 15 is a chart showing qualifying amounts for indicators and discounts corresponding to the example data of FIG. 14.

DETAILED DESCRIPTION

Figure 1:
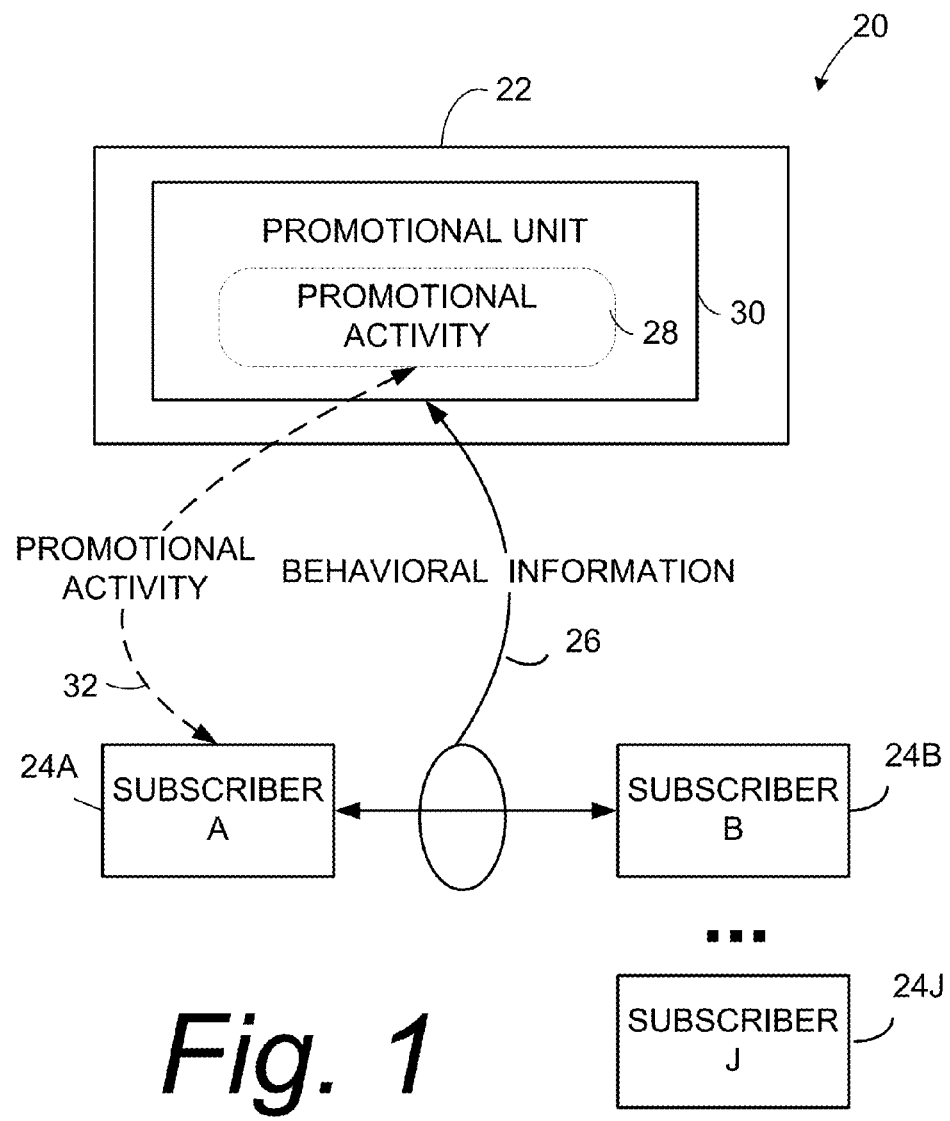
FIG. 1 is a diagrammatic view of an example embodiment of a communication system which includes a promotional node.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows communication system 20 comprising a node 22 which performs a promotional activity with respect to a customer/subscriber, such as customer/subscriber 24A. The customer/subscriber 24A may be just one of plural customer/subscribers (including, e.g., customer/subscribers 24B, . . . 24J) served by communication system 20 or even another communication system. In the example embodiment of FIG. 1, the node 20 is configured to use behavioral information regarding a customer/subscriber's communication usage to automatically perform a promotional activity with respect to communication usages of the customer/subscriber with another customer/subscriber. As such, node 22 is also referred to herein as a "promotional" node. In the example illustration of FIG. 1, promotional node 22 is shown as using behavioral information (the behavioral information being depicted by arrow 26) regarding the communication usage of customer/subscriber 24A to automatically perform a promotional activity 28 with respect to communication usages of customer/subscriber 24A with another customer/subscriber, e.g., customer/subscriber 24B.

In the example embodiment shown in FIG. 1, node 22 comprises promotional unit 30. In various example embodiments promotional unit 30 may be a server, computer/processor, or system of computers/processors which executes or performs the promotional activity 28. Execution of the promotional activity 28 may result in an output or indication depicted by arrow 32. For sake of illustration the promotional activity output arrow 32 is shown in FIG. 1 and elsewhere as having an end ultimately pointing to the customer/subscriber 24A to depict the fact that the output or indication may eventually affect the customer/subscriber 24A (e.g., affect the rate charged to customer/subscriber 24A), not necessarily that the actual output or indication is directly or even indirectly supplied to customer/subscriber 24A. In some example embodiments, the customer/subscriber 24A is notified of a change (e.g., in discount, whether actual or impending, which has resulted or may result from the promotional activity 28.

In one or more of the example embodiments described herein, node 22 may be constituted essentially entirely by promotional unit 30, or may include promotional unit 30 along with other functional units. Moreover, it should be understood that use of the word "unit" does not confine promotional unit 30 as being implemented by any one particular instrumentality or device, as the promotional unit 30 may be distributed or otherwise provided over plural devices (e.g., over plural computers or processors comprising a computer network, for example).

Figure 1A:
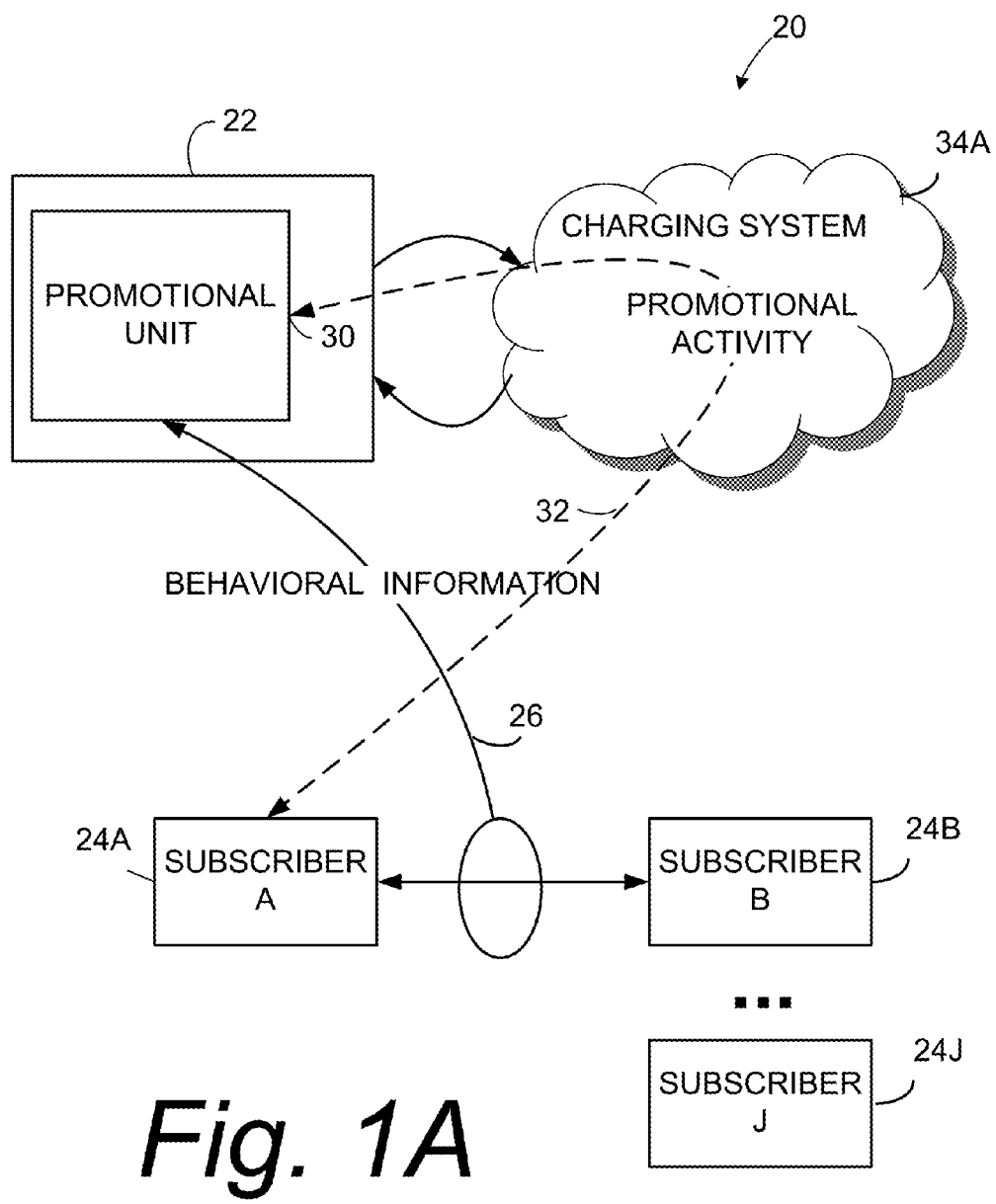
FIG. 1A is a diagrammatic view of an example embodiment of a communication system in which a promotional node works in conjunction with a charging system.
Figure 1B:
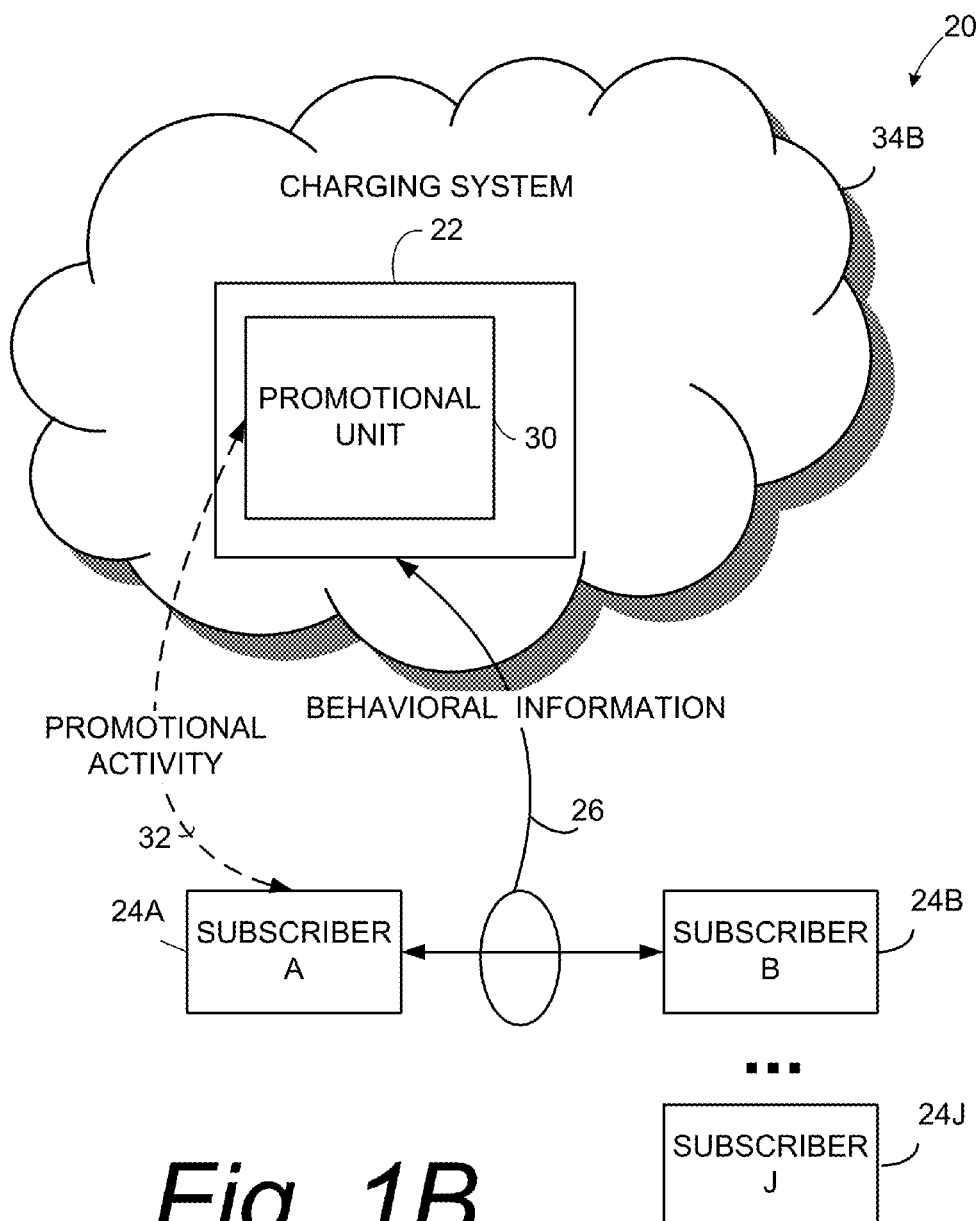
FIG. 1B is a diagrammatic view of an example embodiment of a communication system in which a promotional node is included in a charging system.

Further, it should be understood that, in some example embodiments such as that generically illustrated by FIG. 1A, the promotional node 22 may work in conjunction with a charging system, e.g., the promotional node 22 may be connected to interact and/or cooperate with a charging system such as charging system 34A of FIG. 1A. For example, the promotional node 22 may comprise or form a part of a Service Data Point (SDP), or another node, such as a node of an intelligent network (IN). In other example embodiments such as that generically illustrated in FIG. 1B, the promotional node 22 may actually comprise or be included in a charging system, such as charging system 34 of FIG. 1B. Example activities or functionalities included in example embodiments of charging systems are further described herein, for example with reference to FIG. 17.

Figure 1C:
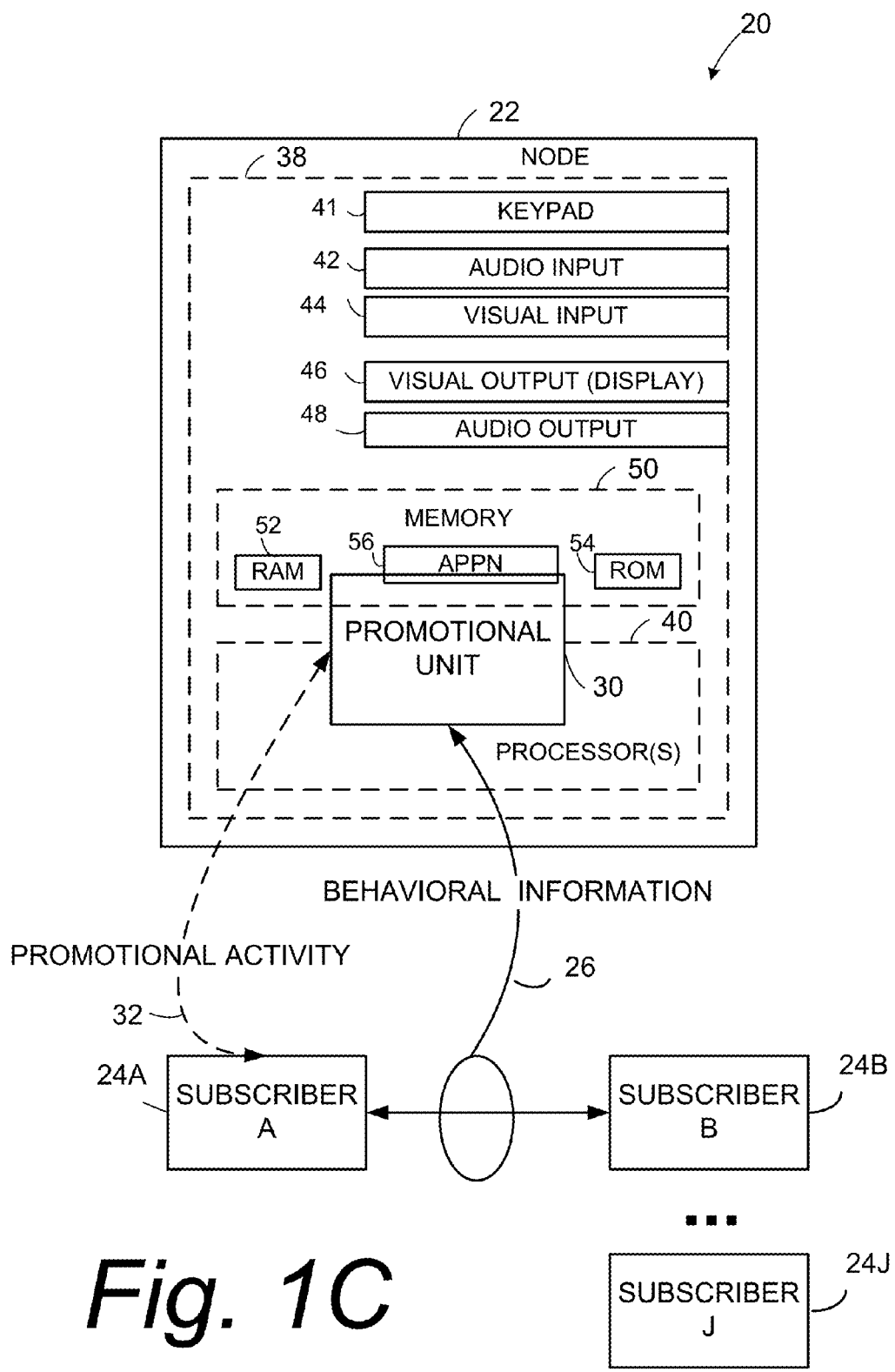
FIG. 1C is a diagrammatic view of an example embodiment of a communication system which includes a promotional node implemented in a machine platform.

FIG. 1C illustrates more structural detail for certain example embodiments of promotional node 22. For example FIG. 1C illustrates that promotional node 22 can be provided on a platform 38. The terminology "platform" is a way of describing how the functional units of mobile station 30 can be implemented or realized by machine. The platform 38 can take any of several forms, such as (for example) a computer implementation platform or a hardware circuit platform. FIG. 1C particularly shows machine platform 38 as being a computer platform wherein logic and functionalities of promotional node 22 are implemented by one or more computer processors or controllers 40 as those terms are herein expansively defined. In conjunction with the computer platform FIG. 1C shows promotional node 22 as including various interfaces, among which are keypad 41; audio input device (e.g. microphone) 42; visual input device (e.g., camera) 44; visual output device (e.g., display 46); and audio output device (e.g., speaker) 48. Other types of input/output devices may also be connected to or comprise promotional node 22. In a computer implementation the promotional node 22 may comprise, in addition to a processor(s), memory section 50 (which in turn can comprise random access memory 52; read only memory 54; application memory 56 (which stores, e.g., non-transitory coded instructions which can be executed by the processor to perform acts described herein); and any other memory such as cache memory, for example). In the example of FIG. 1C the platform 38 has been illustrated as computer-implemented or computer-based platforms. Another example platform suitable for promotional node 22 is that of a hardware circuit, e.g., an application specific integrated circuit (ASIC) wherein circuit elements are structured and operated to perform the various acts described herein. Thus, whether, e.g., by computer-implementation or by hardware circuit implementation, promotional node 22 comprises electronic circuitry, e.g., platform 38.

Figure 2:
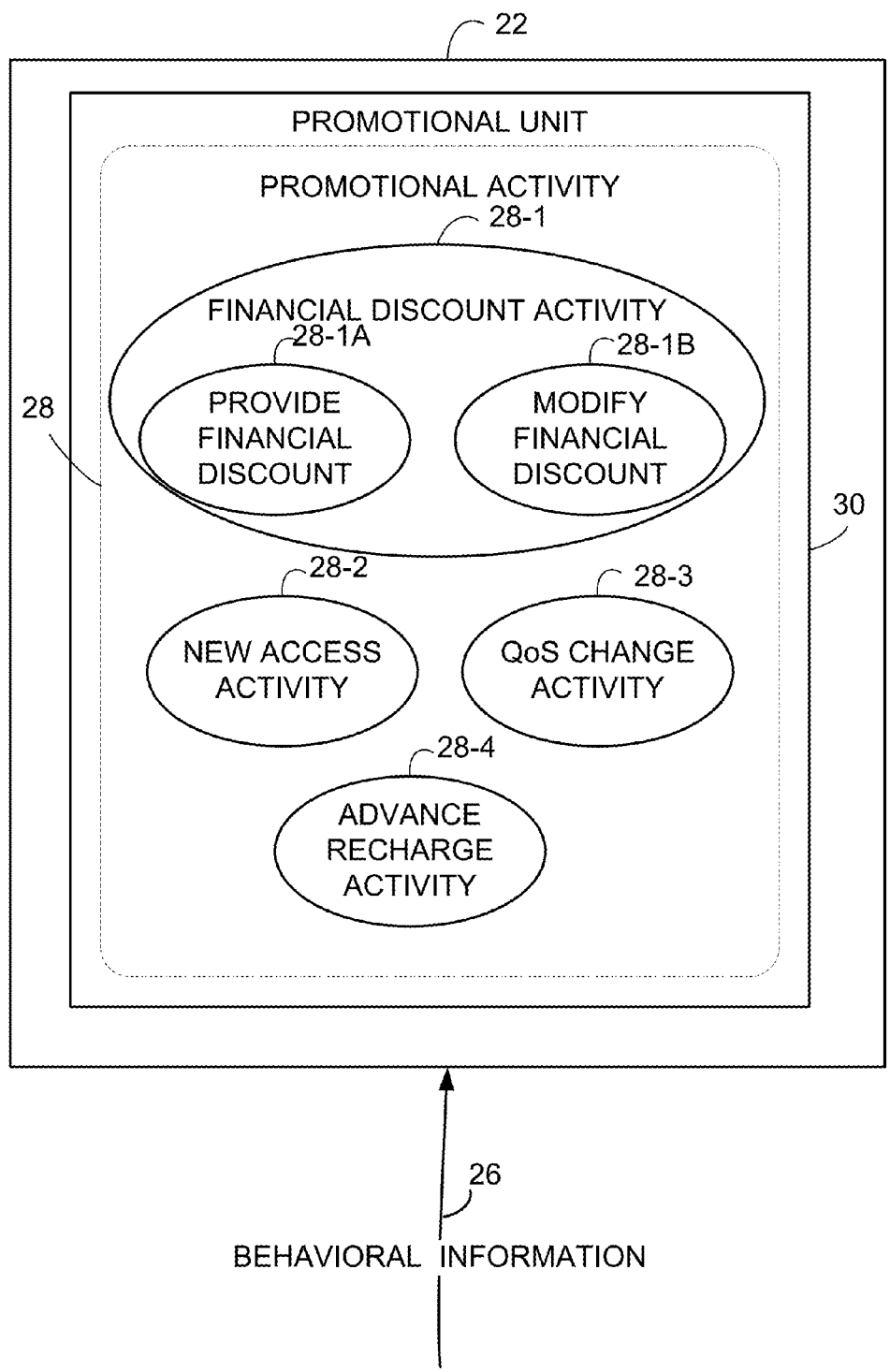
FIG. 2 is a diagrammatic view depicting alternative or conjunctive examples of promotional activity according to an example embodiment.

As mentioned above, promotional node 22 is configured to use behavioral information 26 regarding a customer/subscriber's communication usage, for example communication usage patterns, to automatically perform a promotional activity 28 with respect to communication usages of the customer/subscriber with another customer/subscriber. As illustrated in FIG. 2, the promotional activity 28 performed by promotional node 22 may comprise any activity suitable for encouraging an operator-desired customer/subscriber behavior. For example, the promotional activity 28 may comprise a financial discount activity 28-1; a new access activity 28-2; a quality of service change activity 28-3; or an advance recharge activity 28-4. The financial discount activity 28-1 may comprise, for example, one or both, e.g., at least one, of providing a financial discount 28-1A and modifying a financial discount 28-1B. The new access activity 28-2 may comprise giving the customer/subscriber access to or eligibility for new products and/or services (for example, premium products and/or services). The quality of service (QoS) change activity 28-3 may comprise giving the customer/subscriber better quality of service (e.g., higher priority or more bandwidth). The advance recharge activity 28-4 may comprise the customer/subscriber making a "topup" or account recharge for $100 but actually receiving a credit of $110 on the account The foregoing list of promotional activities is not exhaustive but merely illustrative of myriad types of promotional activities encompassed by the technology disclosed herein.

Some example embodiments of the technology disclosed herein essentially provide a new service, e.g., a promotional activity, on top of or in addition to the charging system. As described herein, some aspects and embodiments involve a financial discount activity 28-1 and thus provide and change a personalized, dynamic tariff based on the subscriber's social network, such social network being reconstructed analyzing the subscriber's communication patterns.

One aspiration of such embodiments of the technology disclosed herein is to promote and increase the stability of the social communities in the operator's subscriber network. In the long term such promotion will increase the traffic and the goodwill for the operator. Moreover, in addition to increasing penetration level, the new promotional activity/service increases the operators' social responsibility. For example, by promoting more stable informational communities through the promotional activity/service the operator responsibly promotes health of society. Yet further, as more socialized citizens tend to communicate yet more, the operator seeks to improve and benefit from stability of the customers' social links. Moreover, a stable subscriber base is less prone to churn, less prone to subscribers leaving the operator.

Figures 3A, 3B:
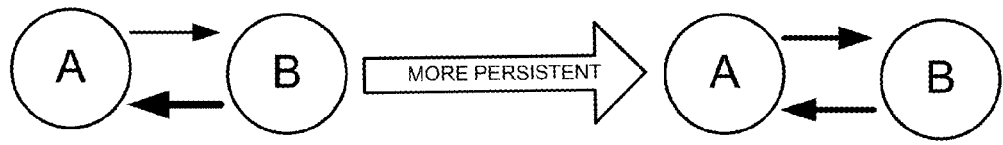
FIG. 3A is a diagrammatic view illustrating that more symmetric (more reciprocal) connections are usually more persistent.
FIG. 3B is a diagrammatic view depicting examples of a persistence calculation.

As recent studies on the dynamics of mobile phone networks have shown, the probability of a given connection (e.g., phone connection) between customer/subscriber 24A and 24B to be a persistent one (that is, existing (for example) more than a few months) is proportional to (1) the reciprocity of the given connection (the number of calls initiated by customer/subscriber 24A is similar to the number of calls initiated by customer/subscriber 24B) and (2) how much customer/subscriber 24A and customer/subscriber 24B are in a similar social community. FIG. 3A serves to illustrate that more symmetric (e.g., more reciprocal) connections tend to be more persistent, e.g., are usually more persistent. As aspect of some example embodiments of the technology disclosed herein is use of the behavioral information 26 to predict a future persistence of communications between the customer/subscriber and the other customer/subscriber.

Figure 2A:
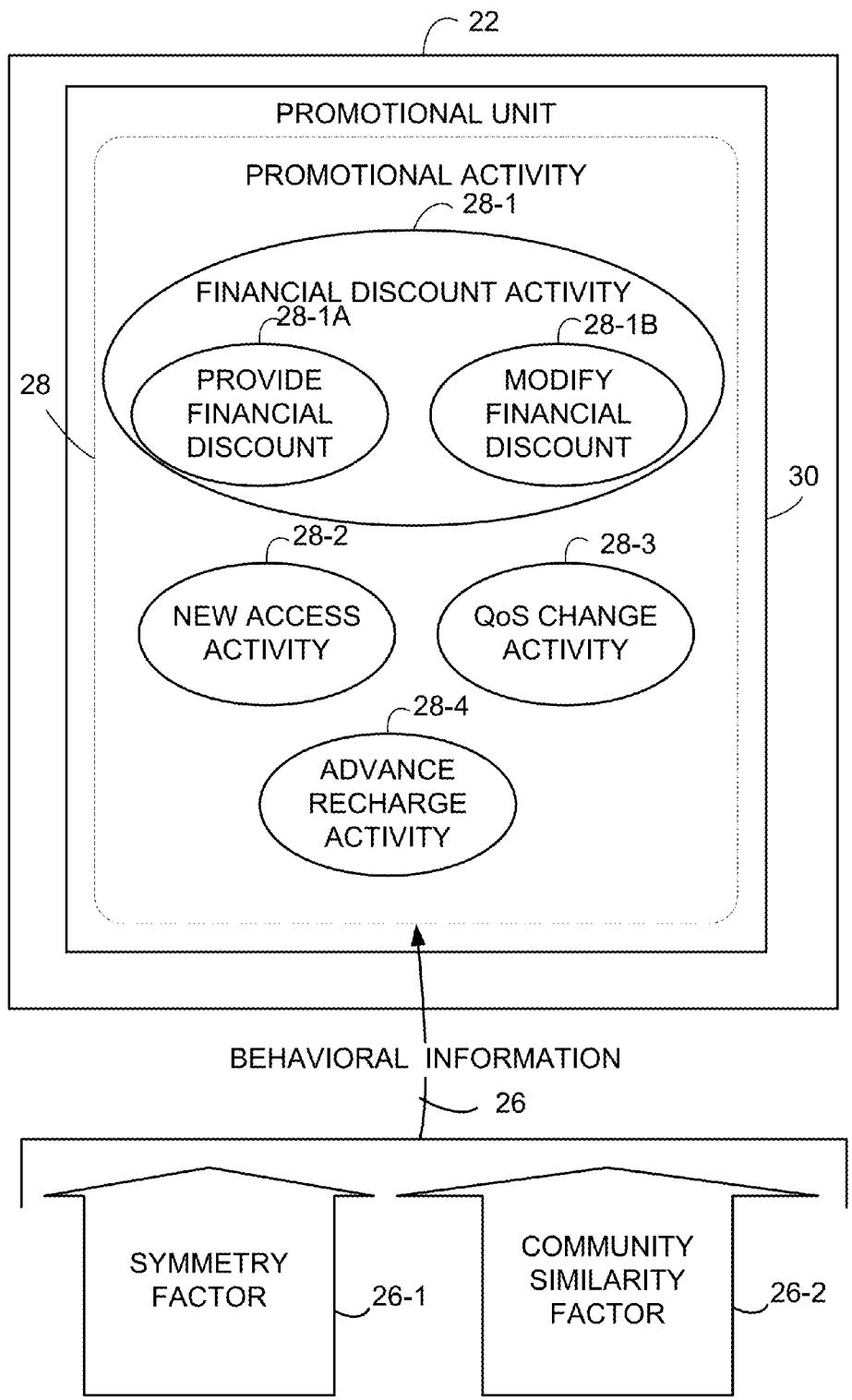
FIG. 2A is a diagrammatic view depicting alternative or conjunctive factors that can be included in a promotional activity according to an example embodiment.
Figure 2B:
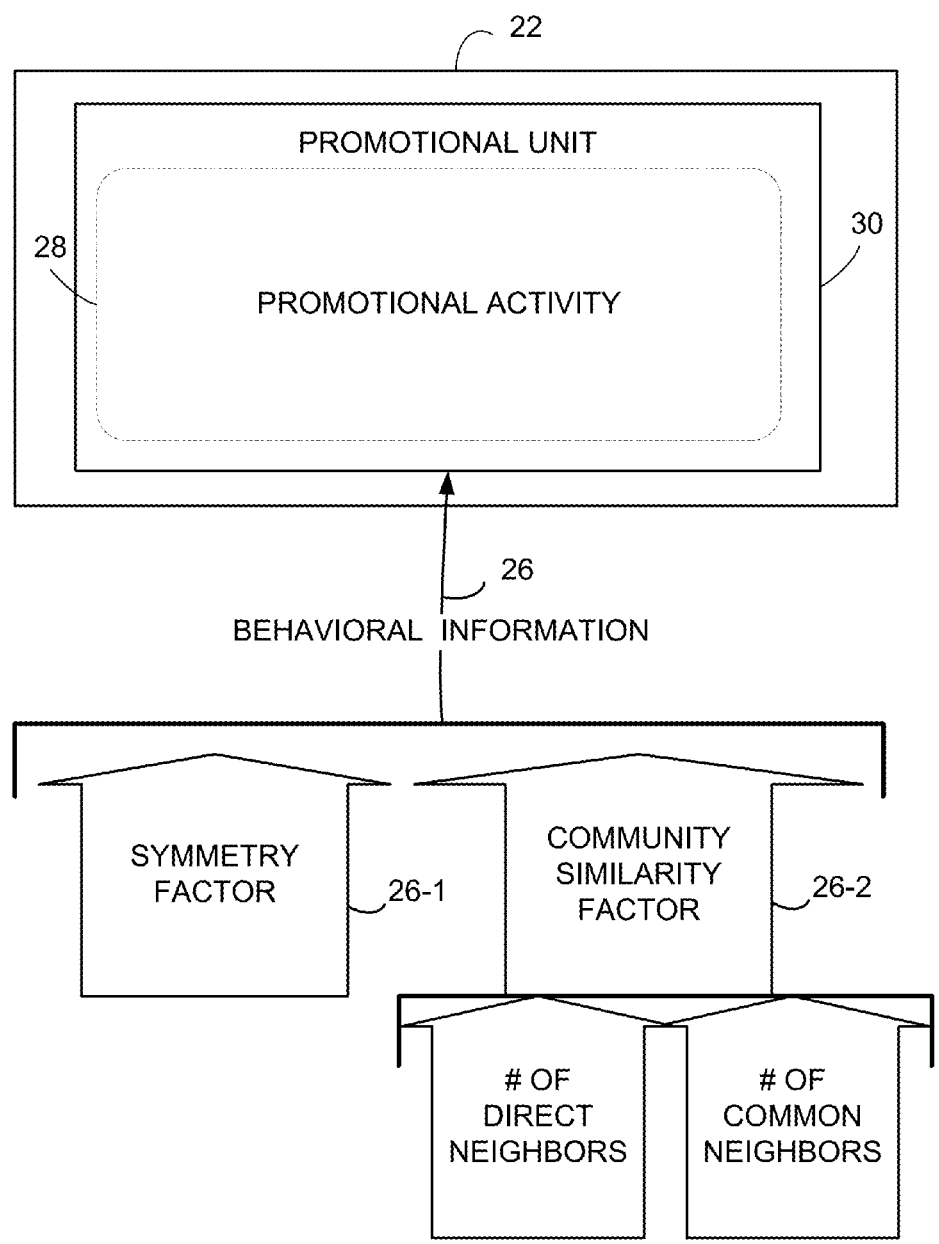
FIG. 2B is a diagrammatic view depicting alternative or conjunctive components of a community similarity factor according to an example embodiment.

In view of the foregoing and other phenomena, in some example embodiments, promotional node 22 performs the promotional activity 28 depending on various factors. For example, as illustrated in FIG. 2A in some example embodiments and modes the promotional node 22 performs the promotional activity 28 depending on whether or not the behavioral information 26 indicates that the customer/subscriber and the other customer/subscriber initiate connections to each other substantially equally. Behavioral information relevant to whether or not the customer/subscriber and the other customer/subscriber initiate connections to each other substantially equally is shown in FIG. 2A and known herein as "symmetry factor" 26-1. As also illustrated in FIG. 2A in some example embodiments and modes the promotional node 22 performs the promotional activity 28 depending on whether or not the behavioral information 26 indicates that the customer/subscriber and the other customer/subscriber belong to a same community. Behavioral information relevant to whether or not the customer/subscriber and the other customer/subscriber belong to a same community is shown in FIG. 2A and known herein as "community similarity factor" 26-2. Indeed, in some example embodiments the behavioral information 26 reflects both symmetry of connection 26-1 of the customer/subscriber with the other customer/subscriber and community similarity 26-2 of the customer/subscriber and another customer/subscriber.

Let $W_{AB}$ be the weight of the communication initiated by customer/subscriber 24A towards customer/subscriber 24B (note that, in sense of directionality, $W_{AB}$ is different from $W_{BA}$). $W_{AB}$ is a complex measurement of the importance of the connection 24A→24B from the viewpoint of subscriber 24A. $W_{AB}$ can be calculated from the duration or the number of calls initiated by customer/subscriber 24A or the number of short message services (SMSes) or multimedia message services (MMSes) sent by customer/subscriber 24A to customer/subscriber 24B, etc. The weight may also depend on the time, for a call initiated a month ago may be not as important now as (for example) a call initiated two hours ago.

In differing embodiments the symmetry of a connection can be measured in many ways. Let $S_{AB}$ define the symmetry of the connection between subscribers 24A and 24B. A simple way to formalize $S_{AB}$ is shown in Expression 1.

$$S_{AB}:=2*\text{Minimum}(W_{AB},W_{BA})/(W_{AB}+W_{BA}) \quad \text{Expression 1}$$

With the definition of symmetry of a connection $S_{AB}$ as set forth in Expression 1, the symmetry of a connection will really be "symmetrical", since $S_{AB}=S_{BA}$. FIG. 3B illustrates examples of the persistence calculation, providing in its left column a weight of directed connections between two subscribers and in its right column a symmetry value for the respective left column situations.

On the other hand, the average persistence of the connections of a given user is higher if the given user is in a denser part of a network, whereas those in sparser parts tend to have non-persistent connections acting as bridges connecting different parts of the network. See, e.g., Hidalgo and Rodriguez (2008), *The Dynamics of a Mobile Phone Network*, Physica A, 378, incorporated herein by reference.

The persistence of a connection may also be proportional to the similarity of the two subscribers' social community. In the phone communication networks, the subscribers tend to form smaller communities. Inside these communities the connections are much more important—the given call is repeated more often—than the connections outside the communities. See, e.g., Onnela et al. (2007), *Structure and Tie Strengths in Mobile Communication Networks*, PNAS, 7332-7336, vol. 104, no. 18, incorporated herein by reference. This observation also suggests that connections inside a community tend to be more persistent (e.g., are usually more persistent) in the future.

Figure 4:
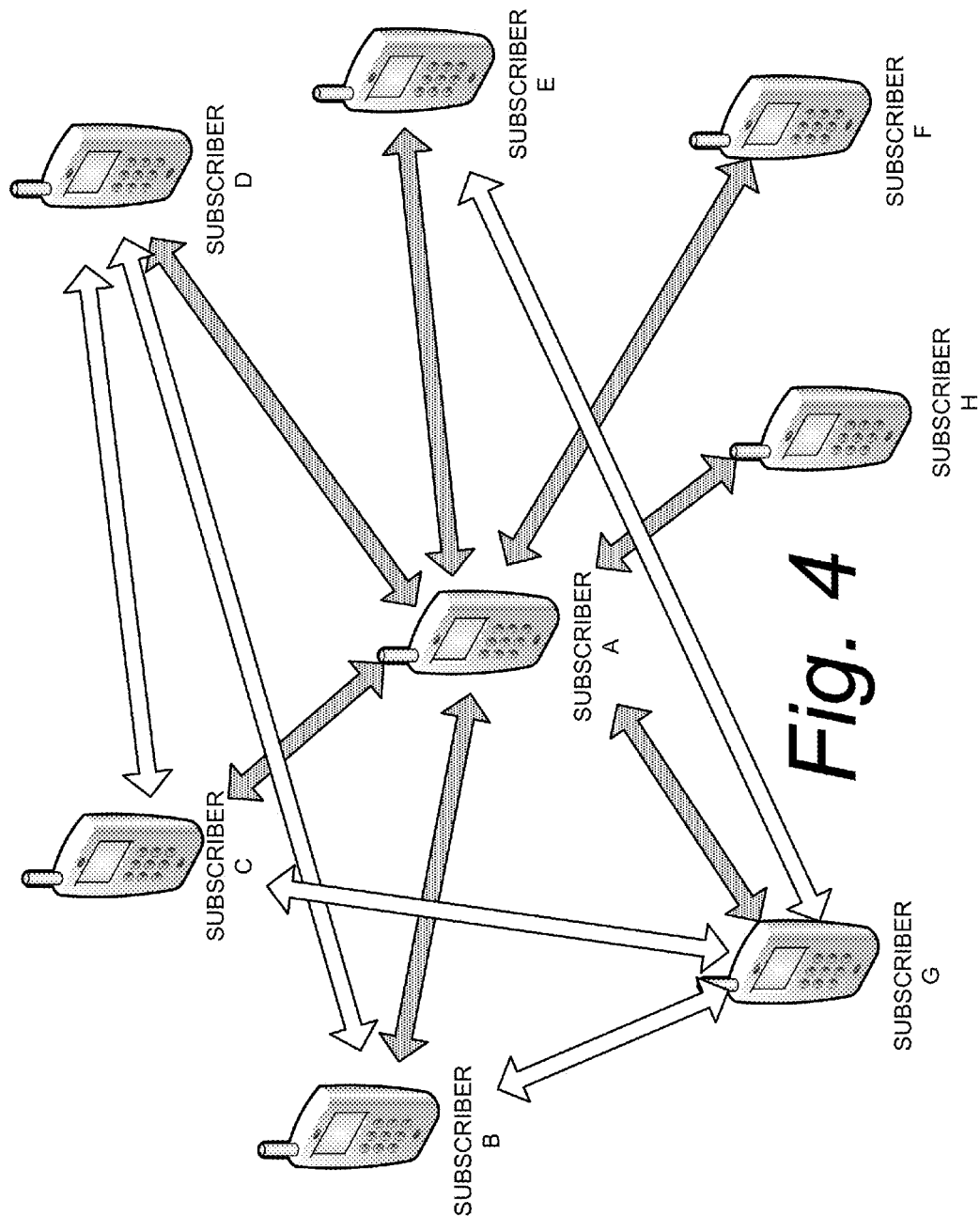
FIG. 4 is a diagrammatic view depicting a community of subscribers for sake of illustrating an example community similarity factor.

For the moment, consider only the network of communication between customer/subscriber 24A and all subscribers connected to customer/subscriber 24A, as shown in FIG. 4. For present discussion, FIG. 4 illustrates the "considered" part of the network, wherein the information that is used is the information of the call statistics between a given subscriber and his first neighbor. Gathering this information is much easier than gathering and analyzing the whole network. If using only a little graph or considered part such as that of FIG. 4, communities can still be defined as fully connected subgraphs, so called "cliques". The size of communities can be defined as the number of element of the clique.

Figure 5A:
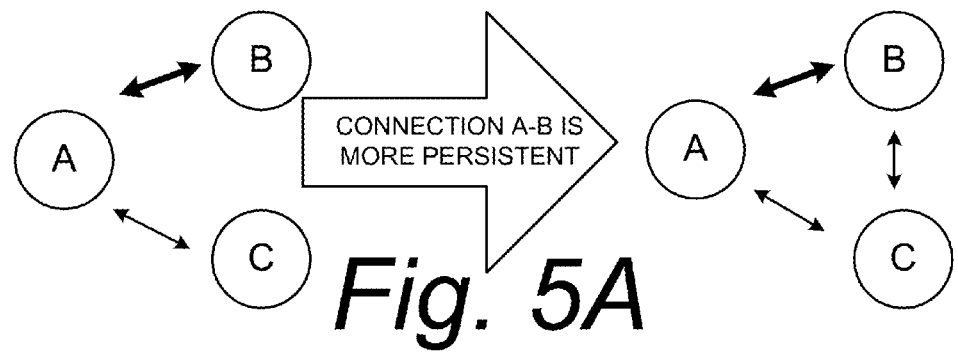
FIG. 5A, FIG. 5B, and FIG. 5C are diagrammatic views illustrating a correlation between predicted persistence and topological position of connections.
Figure 5B:
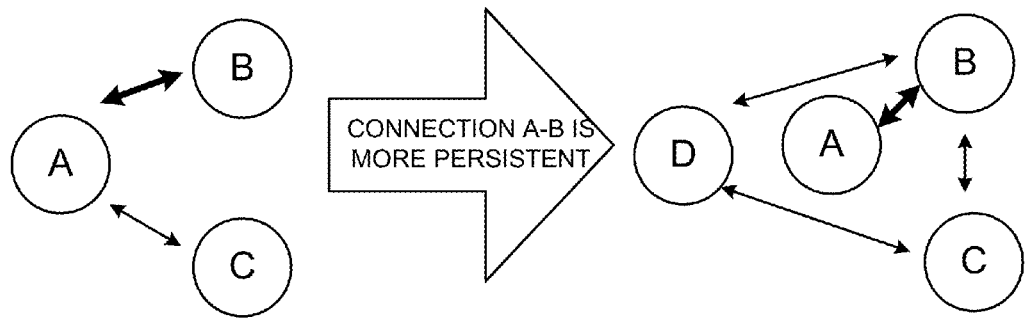
Figure 5C:
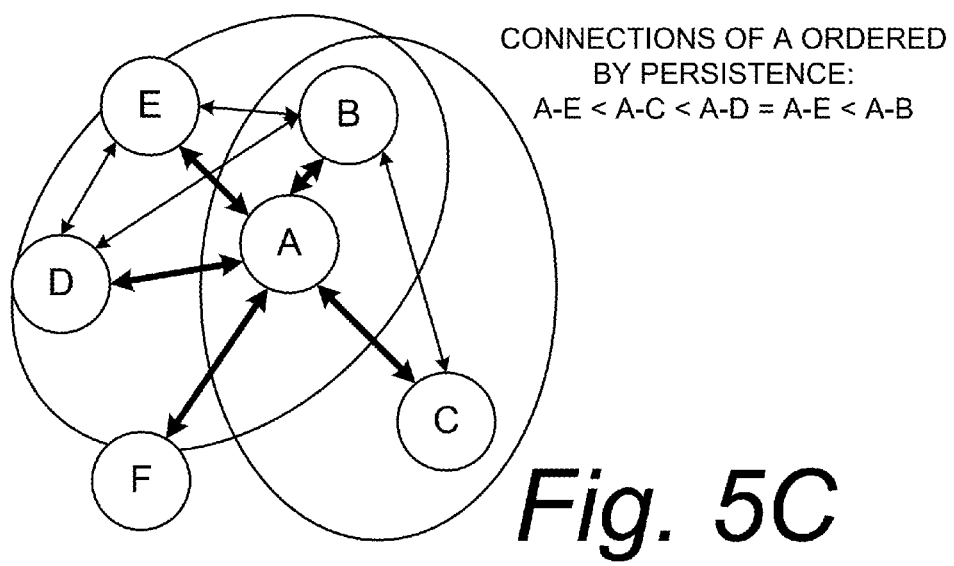

The fact that a connection is part of a community should increase the probability of the connection's future permanency (as shown, for example, in FIG. 5A). If the connection is inside a larger community, this fact increases this probability of the future permanency even more (see FIG. 5B). The communities can have different sizes and different communities can overlap even in the small graph (see FIG. 5C).

The detection of overlapping communities by identifying cliques is a well known algorithm, called "k-clique percolation". The topic of k-clique percolation is described, e.g., in Palla et al. (2005), *Uncovering the Overlapping Community Structure of Complex Networks in Nature and Society*, Nature 435, 814-818, incorporated herein by reference. However, in the small graphs illustrated herein there is no need for community detection developed for large-scale networks. The small graph used for the present illustration contains the calls of a given subscriber and the calls between his neighbors (see FIG. 4). The determination of the community similarity can be used by the defining the community similarity of subscriber 24A and 24B to be (the number of their common neighbors+1) divided by (the number of neighbors of A), as set forth in Expression 2.

$$\text{(the number of their common neighbors+1)/(the number of neighbors of } A) \quad \text{Expression 2}$$

The community similarity expression described above differs from well-known topological overlap measurement. The topological overlap measurement is described in the two following publications, both incorporated herein by reference: (1) Ravasz, R., Somera, A. L., Mongru, D. A., Oltvai, Z. N. and Barabasi, A. L. (2002), *Hierarchical Organization of Modularity in Metabolic Networks*, Science 297, 1551-1555; (2) Yip, A. M. and Horvath, S. (2007), *Gene Network Interconnectedness and the Generalized Topological Overlap. Measure BMC Bioinformatics*, http://www.biomedcentral.com/1471-2105/8/22. The community similarity formula described above differs from the topological overlap measurement since, e.g., for calculating the topological overlap one must additionally need all the other connections of the neighbors. So in case of communication sub-networks, it is more effective to use the modular similarity herein described.

Figure 6:
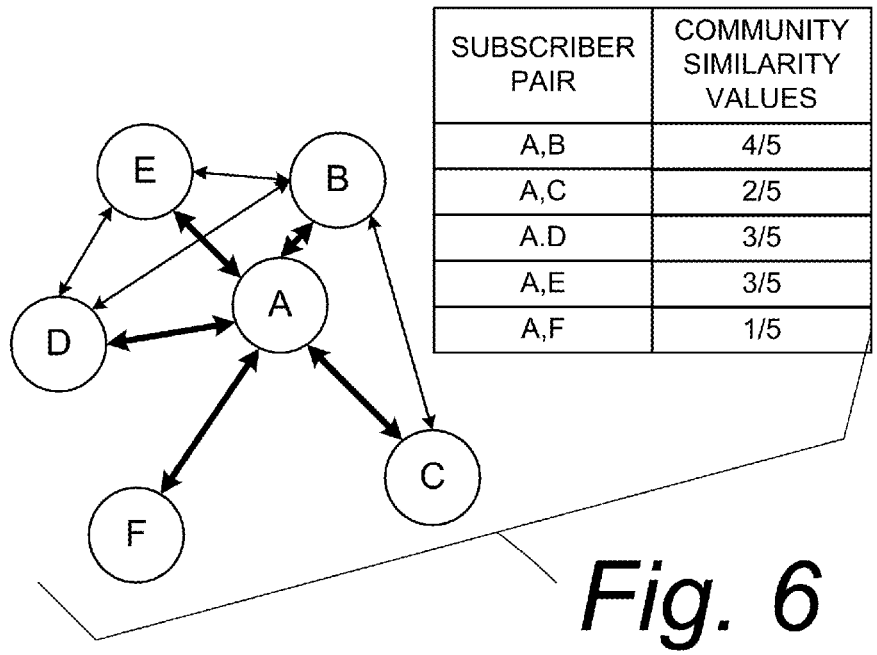
FIG. 6 is a diagrammatic view depicting examples for community similarity values and dependency of the community similarity value on a customer/subscriber and another customer/subscriber being in a same community.

The community similarity of Expression 2 provides a similarity value which is a number between 0 and 1. A similarity value near zero implies that two customer/subscribers do not really share common neighbors, while a similarity value near 1 suggests that all of the neighbors of the two customer/subscribers are common. FIG. 6 show example community similarity values for a particular scenario, depicting in the right column a community similarity value related to how much a particular customer/subscriber and his given neighbor are in a same community. For this particular non-limiting example, the community similarity values of FIG. 6 are determined based on Expression 2.

One aspect of the technology disclosed herein provides a technique of essentially predicting future importance and persistence of a given connection and performing a promotional activity 28 based on such prediction. The promotional activity 28 may be performed by promotional node 22 in any of its embodiments as described herein or encompassed hereby. The technique obtains a list of connections (the network of calls between the given subscriber and his contacts) as an input. The technique provides a promotional value D to every subscriber connected to a particular customer/subscriber 24A as an output. This promotional value D is a measurement of the future importance and persistence and is not an exact amount of money. The promotional value D determined by the technique may be converted to an appropriate amount of discount or bonus or other activity measure based on (e.g., depending on application of) business considerations such as those expressed by charging system rules or the like.

For purposes of further discussing the promotional activity 28 and determination of the promotional value $D_B$ in particular, and with reference to FIG. 4, a given subscriber is denoted as customer/subscriber 24A, and all of customer/subscriber's 24A contacts are denoted as customer/subscribers 24B, customer/subscriber 24C, etc. $D_B$, $D_C$, etc. are used to denote the promotional values of the respective subscribers 24B, 24C, etc., connected to customer/subscriber 24A. Given such notation, example, representative acts or steps of a generic technique for performing the promotional activity 28 and determining the promotional value D are illustrated in FIG. 7.

Figure 7:
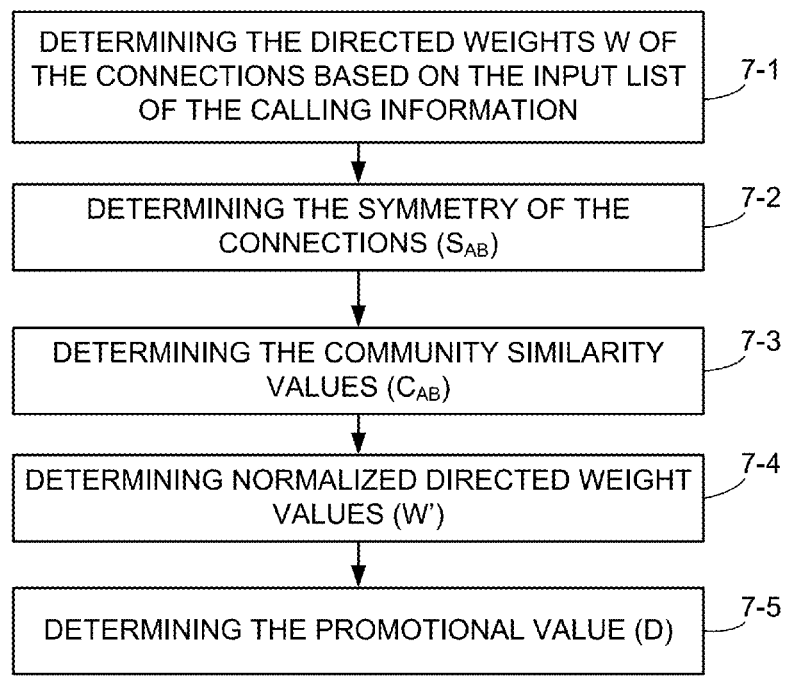
FIG. 7 is a flowchart showing example acts or steps preformed in conjunction with a method of performing a promotional activity to determine a discount value.

Act 7-1 of FIG. 7 comprises determining the directed weights of the connections based on the input list of the calling information. For example, $W_{AB}$:=the number of calls or SMSes initiated by subscriber 24A toward subscriber 24B in the last month. Act 7-2 comprises determining the symmetry of the connections. For example, in an example embodiment and mode the symmetry value is determined by Expression 3.

$$S_{AB} := \text{Minimum}(W_{AB}, W_{BA})/(W_{AB}+W_{BA}). \quad \text{Expression 3}$$

Act 7-3 comprises determining the community similarity values ($C_{AB}$) (e.g., according to the formula described above). Act 7-4 comprises determining normalized W' values, such as by evaluating Expression 4.

$$W'_{AB} := W_{AB}/\max(W). \quad \text{Expression 4}$$

Act 7-5 comprises determining the promotional value, for example by evaluating Expression 5.

$$D_B := (S_{AB}+C_{AB})*W'_{AB}. \quad \text{Expression 5}$$

As mentioned above, the promotional value resulting from Expression 5 will be a real number between 0 and 1. This promotional value D may be the output depicted by arrow 32 in FIG. 1, for example. As also stated above, the promotional value D resulting from Expression 5 may be converted to an appropriate amount of discount or bonus or other activity measure based on (e.g., depending on application of) business considerations such as those expressed by charging system rules or the like.

Thus, in some example embodiments the promotional node 22 may be configured to determine a promotional value $D_B$ for communication usages of the customer/subscriber relative to the other customer/subscriber, with the promotional value $D_B$ being determined according to Expression 5, e.g., $D_B = (S_{AB}+C_{AB})*W'_{AB}$, wherein $S_{AB}$ is a symmetry of connection value of the customer/subscriber with another customer/subscriber; $C_{AB}$ is a community similarity value of the customer/subscriber and the other customer/subscriber; and $W'_{AB}$ is a normalized value of a number of connections initiated by the customer/subscriber to the other customer/subscriber.

As also understood from the foregoing, in some example embodiments the community similarity may depend on a number of common neighbors of the customer/subscriber and the other customer/subscriber and the number of neighbors of the customer/subscriber. For example, the symmetry of connection value $S_{AB}$ may be determined by the expression $S_{AB} = \text{minimum}(W_{AB}, W_{BA})/(W_{AB}+W_{BA})$, wherein $W_{AB}$ is the number of connections initiated by the customer/subscriber to the other customer/subscriber and $W_{BA}$ is a number of connections initiated by the other customer/subscriber to the customer/subscriber.

The symmetry of a connection means customer/subscribers 24A and 24B are symmetrical (S=2) if they call each other equally, which then means that this connection is more stable. If customer/subscriber 24A calls customer/subscriber 24B more often than customer/subscriber 24B calls customer/subscriber 24A, their connection is more likely to dissolve.

Higher normalized weight means that two subscribers call each other more than average, hence are more important to the operator. And the customer can also save money, so it is important that lengthy connections be rewarded. This is a reason why the normalized weight values are used in Expression 5. Of course, normalized weight values need not be utilized in all embodiments of the technology disclosed herein.

In example embodiments, the community similarity value may be determined by the expression $C_{AB}(1+N_{AB})/N_A$, where $N_{AB}$ is a number of common neighbors of the customer/subscriber and the other customer/subscriber and $N_A$ is the number of neighbors of the customer/subscriber. The higher community similarity implies the given neighbor more likely belongs to the same community structure than subscriber 24A. It means their connection should be more stable in the future, so it can be rewarded more by the operator.

Awards, promotions, and/or discounts based on the promotional value can be applied to "bad" and/or "good" customer/subscribers. "Good" subscribers can be awarded as model-subscribers in hope that "bad" subscribers would like to become "good" in order to get the discounted price. "Bad" subscribers can be awarded discounts as incentive to become better. For example, if a connection between A and B is not symmetrical, and A call more B, then there are two choices. A first choice is to give a discount to customer/subscriber A to call customer/subscriber B, as a good subscriber and hope that customer/subscriber B would want to become as customer/subscriber A and start calling customer/subscriber A more, to obtain the discount. A second choice is to give a discount to customer/subscriber B, as a incentive to start calling customer/subscriber A more and to make the connection symmetrical.

While Expression 5 and other constituent expressions thereof provide an advantageous example embodiment, it should be understood the basic concept of the technology disclosed herein is more general than the specific expressions described above. For example, other expressions can be employed to obtain a promotional amount, and such expressions need not have terms comparable to all the terms of Expression 5. Preferably but not necessarily the expression utilized reflect one or both of the symmetry factors 26-1 and the community similarity factor 26-2 as illustrated in FIG. 2A.

Figure 8:
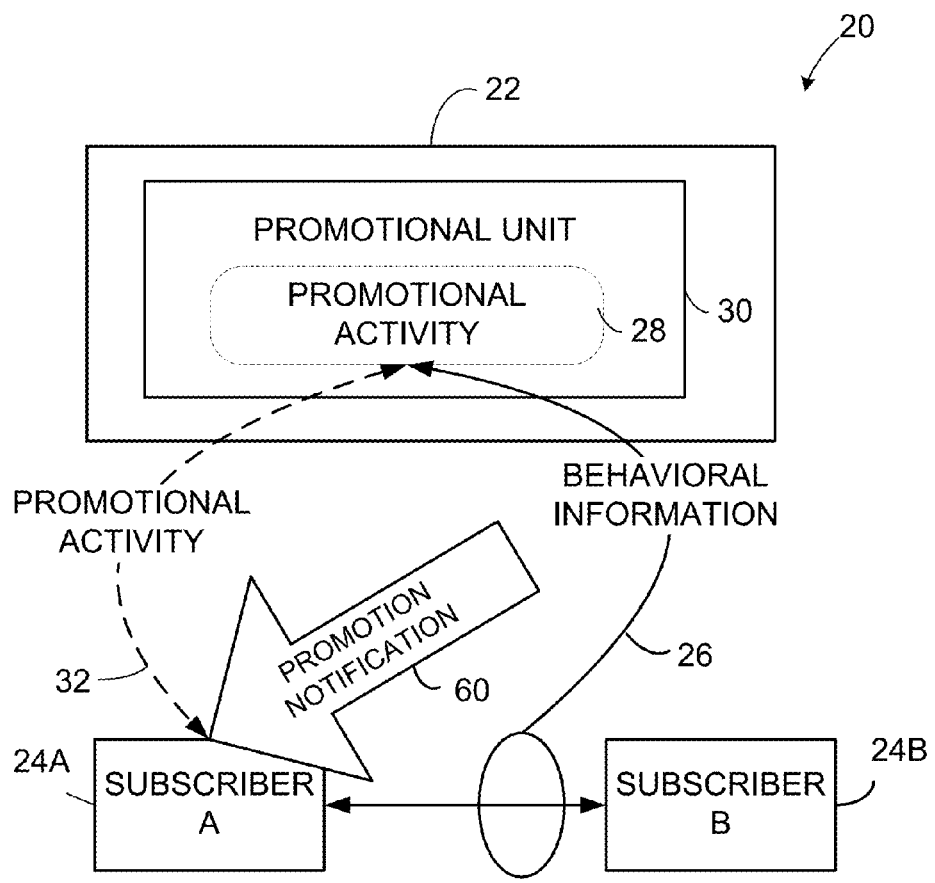
FIG. 8 is a diagrammatic view of an example embodiment of a communication system in which a customer/subscriber is provided with a notification of a promotional activity relative to another customer/subscriber.

In the example embodiment, however the promotional value D is determined (e.g., according to an expression such as $D_B = (S_{AB}+C_{AB})*W'_{AB}$ or any other technique), the node 22 may be configured to re-evaluate the promotional value D periodically. Upon each re-evaluation the node 22 may cause the customer/subscriber to be informed of results of the re-evaluation. In this regard, FIG. 8 illustrates promotional notification message 60 being provided to (e.g., transmitted to) customer/subscriber 24A.

Figure 8A:
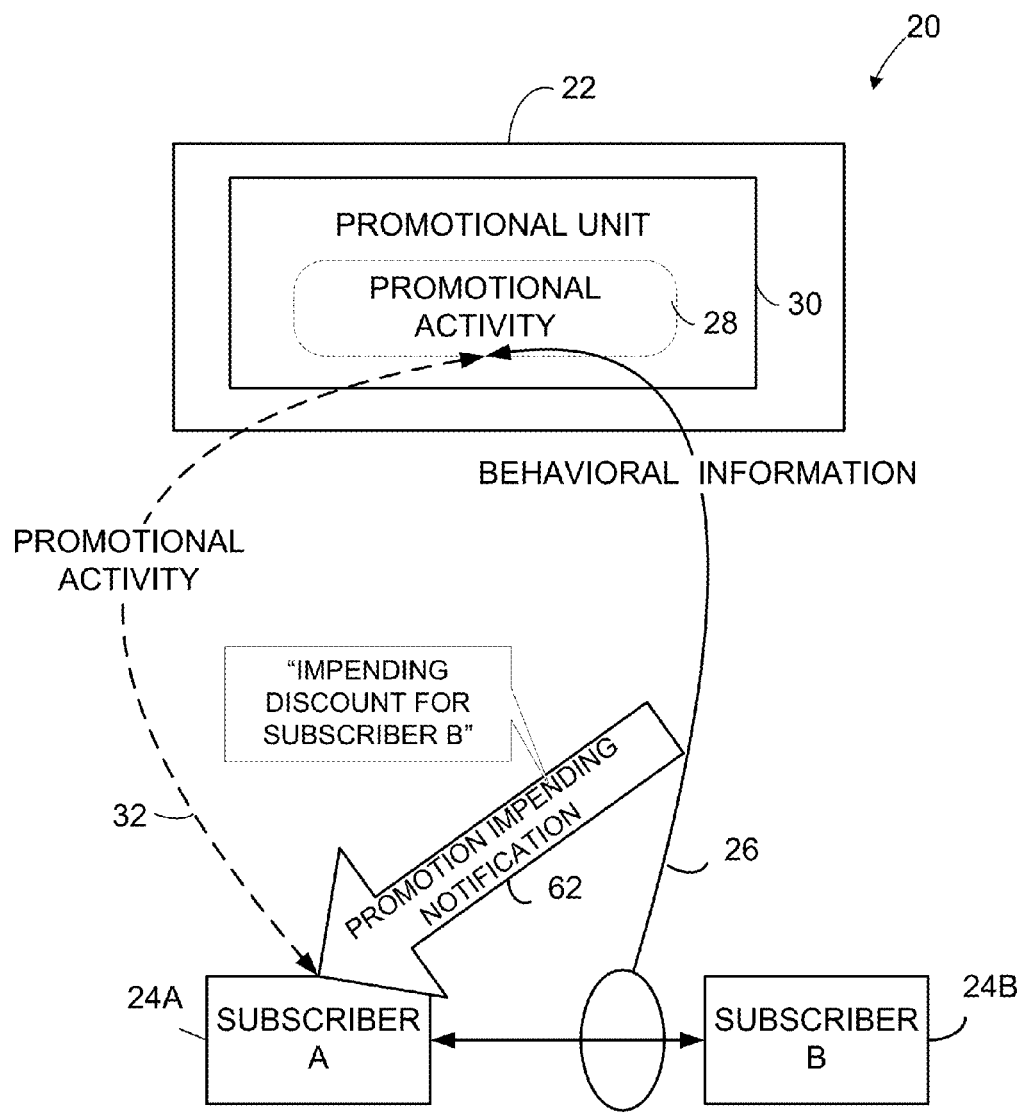
FIG. 8A is a diagrammatic view of an example embodiment of a communication system in which a customer/subscriber is provided with a notification of an impending promotional activity relative to another customer/subscriber.

FIG. 8A shows a situation in which, as the promotional value D is being periodically re-evaluated, the customer/subscriber customer/subscriber 24A receives a promotion impending notification message 62. An example embodiment and mode for FIG. 8A is one in which an ex ante (in advance) dynamic discount is based on Social Network Behavior (e.g., the tighter the social interactions, the cheaper the connections to one another), and subscribers are awarded every two weeks, without being required to do any action. In such an embodiment and mode, a customer/subscriber may, as an optional network service, receive a SMS/USSD notification such as the following: "Dear customer 24A, we kindly inform you that you will call cheaper the following three other customer numbers in the next two weeks: . . . , . . . , . . . ".

Figure 8B:
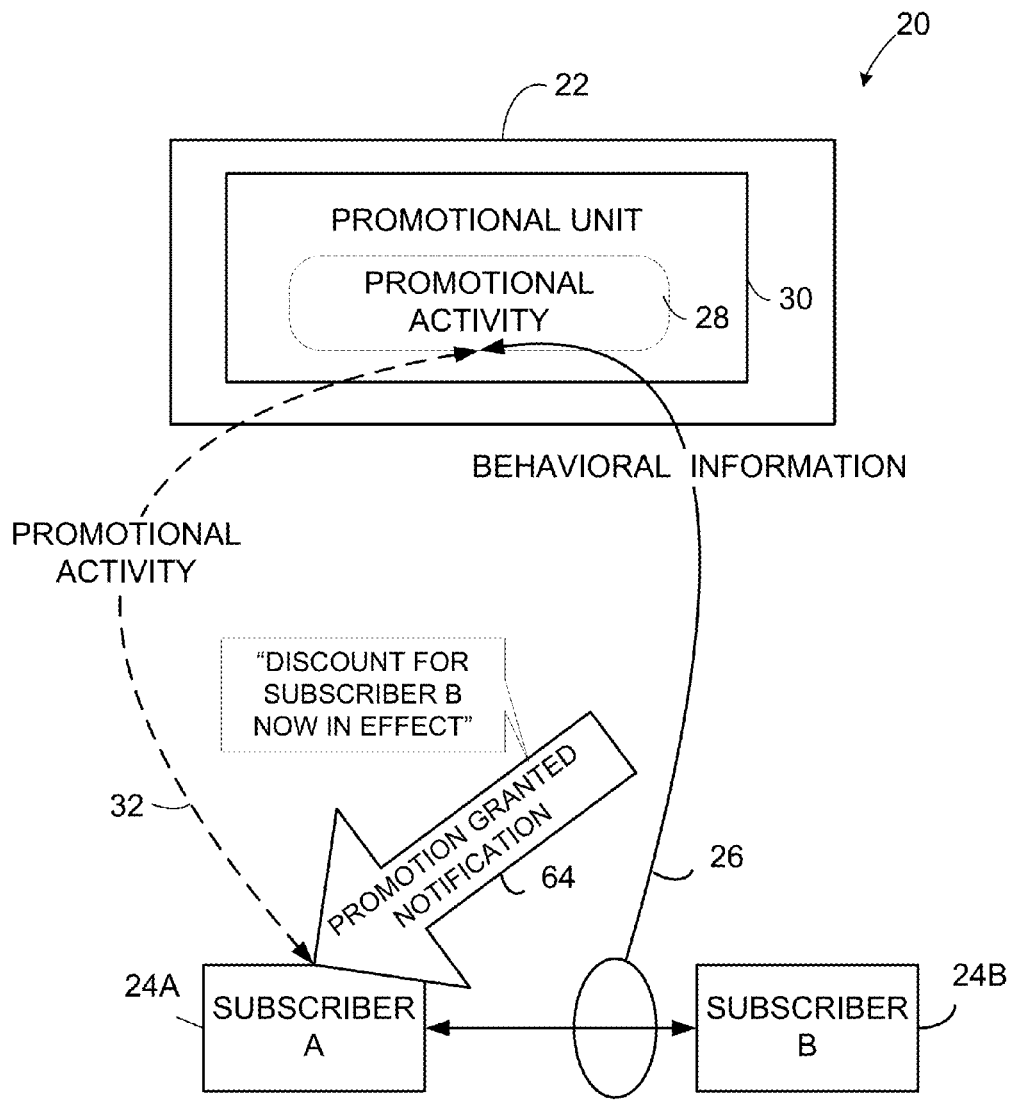
FIG. 8B is a diagrammatic view of an example embodiment of a communication system in which a customer/subscriber is provided with a notification of an accomplished (granted) promotional activity relative to another customer/subscriber.

FIG. 8B shows a situation in which, as the discount value D is being periodically re-evaluated and upon the promotional node 22 making a determination that a new promotion is to be granted, the customer/subscriber customer/subscriber 24A receives a promotion granted notification message 64. FIG. 8B thus illustrates the promotion granted notification message 64 being provided upon a customer/subscriber earning a specific discount value.

From the foregoing it should be appreciated that the promotion value D may be a value that is used by any of the example promotional activities (e.g., including the example promotional activities of FIG. 2). For example, the promotion value D may be a discount value, a credit or score or ranking that is evaluated to determine if there may be a change of quality of service (QoS), access to an additional product or service, or eligibility for an advance recharge program or the like.

Figure 9A:
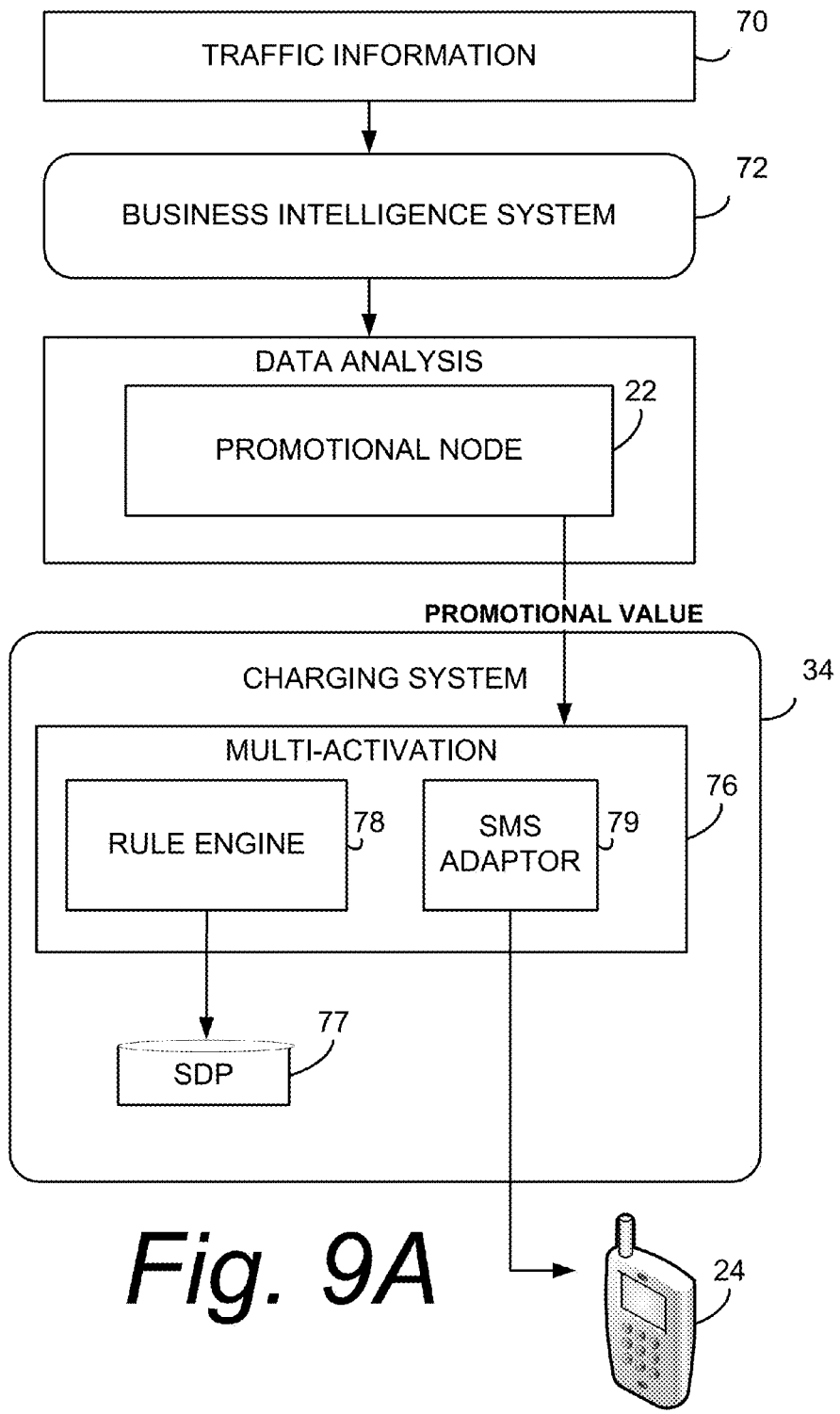
FIG. 9A is a diagrammatic view showing connection of a promotional node to other network elements/nodes according to an example embodiment.

FIG. 9A shows connection and placement of promotional node 22 relative to other network nodes/elements in an example embodiment, and particularly an embodiment suitable for determining the promotional value in accordance with the technology disclosed, including embodiments which utilize an expression such as Expression 5, for example. FIG. 9A also illustrates how the network nodes/elements interact in conjunction with the promotional activity 28. For example, FIG. 9A shows that a source of traffic information 70 provides traffic information to business intelligence system 72. In an example embodiment the business intelligence system 72 can take the form of an Analytics Suite or other business intelligence system. The business intelligence system 72 sends serves to gathering the social behavior patterns of the subscribers. Based on the information retrieved from business intelligence system 72, the promotional node 22 performs its promotional activity 28 and sends updated information to charging system 34. The promotional activity 28 may include the technique(s) described above for determining the promotional value (e.g., using an expression such as Expression 5, for example). In an example embodiment charging system 34 comprises a multi-activation section 76 and service data point (SDP) 77. The multi-activation section 76 in turn comprises rule engine 78 and short message service (SMS) adaptor 79.

As shown by FIG. 9A, the promotional value determined by promotional node 22 is applied to rule engine 78. The multi-activation section 76 may aspire to have flexible provisioning of any discount. The rule engine 78 of multi-activation section 76 is used to allow flexible provision of promotions, e.g., discounts, to a separate rule engine of the charging system 34 which is maintained in service data point (SDP) 77. The separate rule engine in service data point (SDP) 77 is used for charging, e.g., uses the promotional value to determines an actual benefit, e.g., a financial discount, access to additional services, eligibility for different quality of service (QoS), etc., as understood with reference to the promotional activities 28 of FIG. 2. Thus, the rule engine 78 helps determine how to provision the charging system 34. The SMS adaptor 79 is used to initiate a discount notification message to the customer/subscriber 24, such as one of the discount notification messages shown in FIG. 8, FIG. 8A, or FIG. 8B.

Figure 9B:
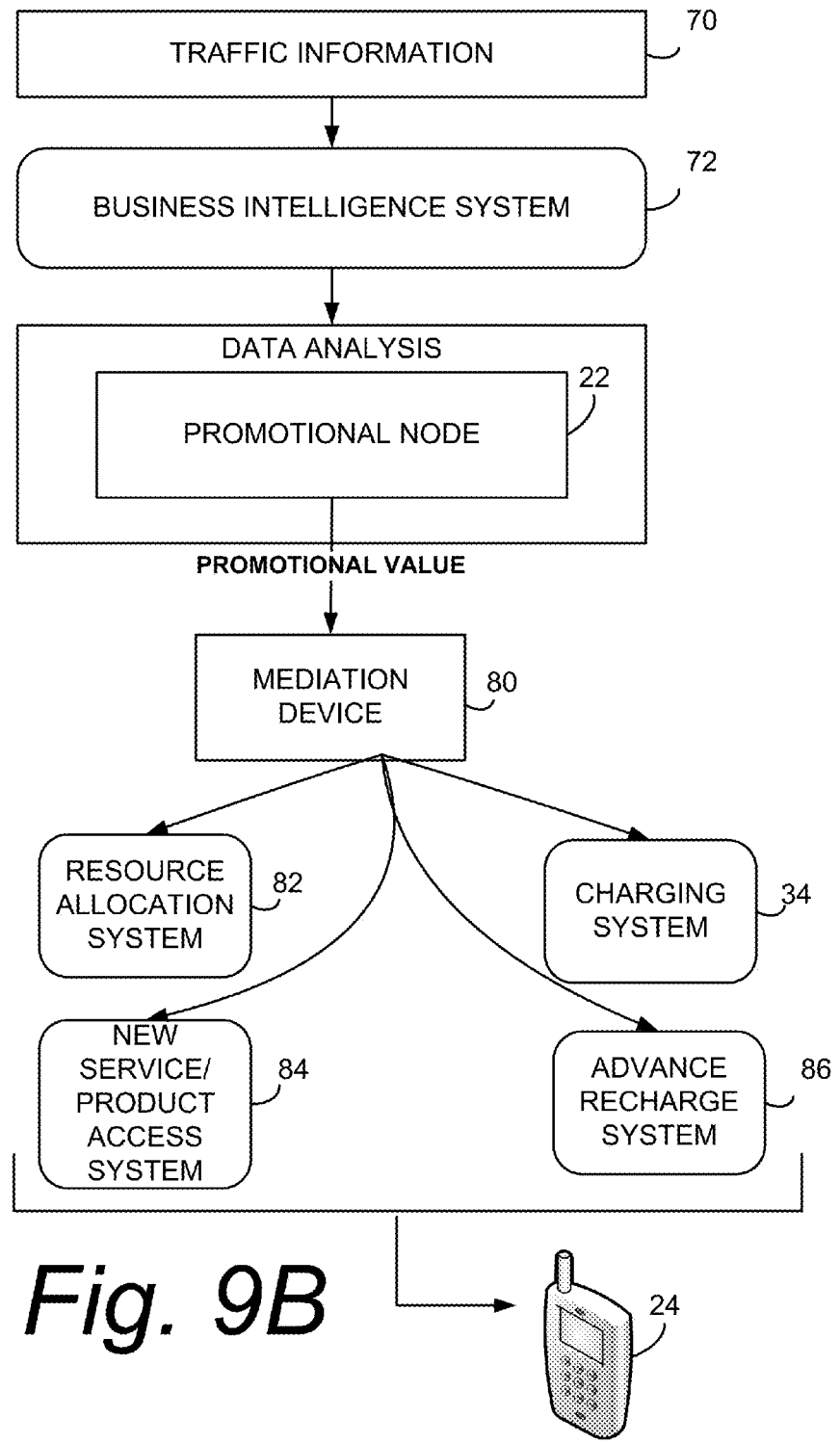
FIG. 9B is a diagrammatic view showing connection of a promotional node to other network elements/nodes through a mediation device according to an example embodiment

FIG. 9B resembles FIG. 9B but further shows how a mediation device 80 may be connected between or interface promotional node 22 and another node or system, the identity of such other node or system being dependent on the nature of the promotional activity. For example, and with reference to FIG. 2, the mediation device 80 may be used to connect or interface promotional node 22 to charging system 34 (such as the charging system 34 of FIG. 9A) when the promotional activity is (for example) a financial discount. FIG. 9B further shows that mediation device 80 may additionally or alternatively connect or interface promotional node 22 to other nodes or systems. For example, mediation device 80 may additionally or alternatively connect or interface promotional node 22 to new product/service access node or system 84 (giving the customer/subscriber access to or eligibility for new products and/or services [for example, premium products and/or services] and thereby facilitating performance of activity 28-2 of FIG. 2). As a further example, mediation device 80 may additionally or alternatively connect or interface promotional node 22 to resource allocation node/system 82 (for changing a quality of service [e.g., higher priority or more bandwidth] for a customer/subscriber, and thereby facilitating performance of activity 28-3 of FIG. 2). As yet another example, mediation device 80 may additionally or alternatively connect or interface promotional node 22 to advance recharge system 86 (for rendering the customer/subscriber eligible for advance recharges), and thereby facilitating performance of activity 28-4 of FIG. 2).

The mediation device 80 may be any device that converts one format to another format or which enables one system or unit or node to understand another system or unit or node. For example, the mediation device 80 may serve to convert or translate the output of promotional node 22 to a value, instruction, or command that another system (such as resource allocation node/system 82, new product/service access system 84, or advance recharge system 86) can understand or use. As such, the mediation device 80 may include a set of rules or logic for converting or translating the output of promotional node 22 to a format or value that the receiving system can understand. Likewise, the mediation device 80 may be bi-directional in interpreting or converting output or signals from system such as systems 82, 84, or 86 to a format or value understandable by promotional node 22.

The technology thus far described has numerous advantages. For example, the promotional activity 28 performed by promotional node 22 and the determination of the promotional value is automatic, e.g., there is no need for the subscriber or the operator to act. In addition, provision and performance of the promotional activity 28 is a dynamic solution which follows (is in correspondence and accordance with) the changes in the social behavior of the subscribers. Moreover, provision and performance of the promotional activity 28 creates and/or enhances a feeling of community, togetherness, e.g., makes the customers more socialized (a better end user experience). Further, provision and performance of the promotional activity 28 provides a new network-based service to the operator, and in particular a service with significant social as well as potential economic benefits. Yet further, provision and performance of promotional activity 28 enhances the operator's traffic over the long term and decreases the churn, i.e., subscribers leaving the operator.

Figure 10:
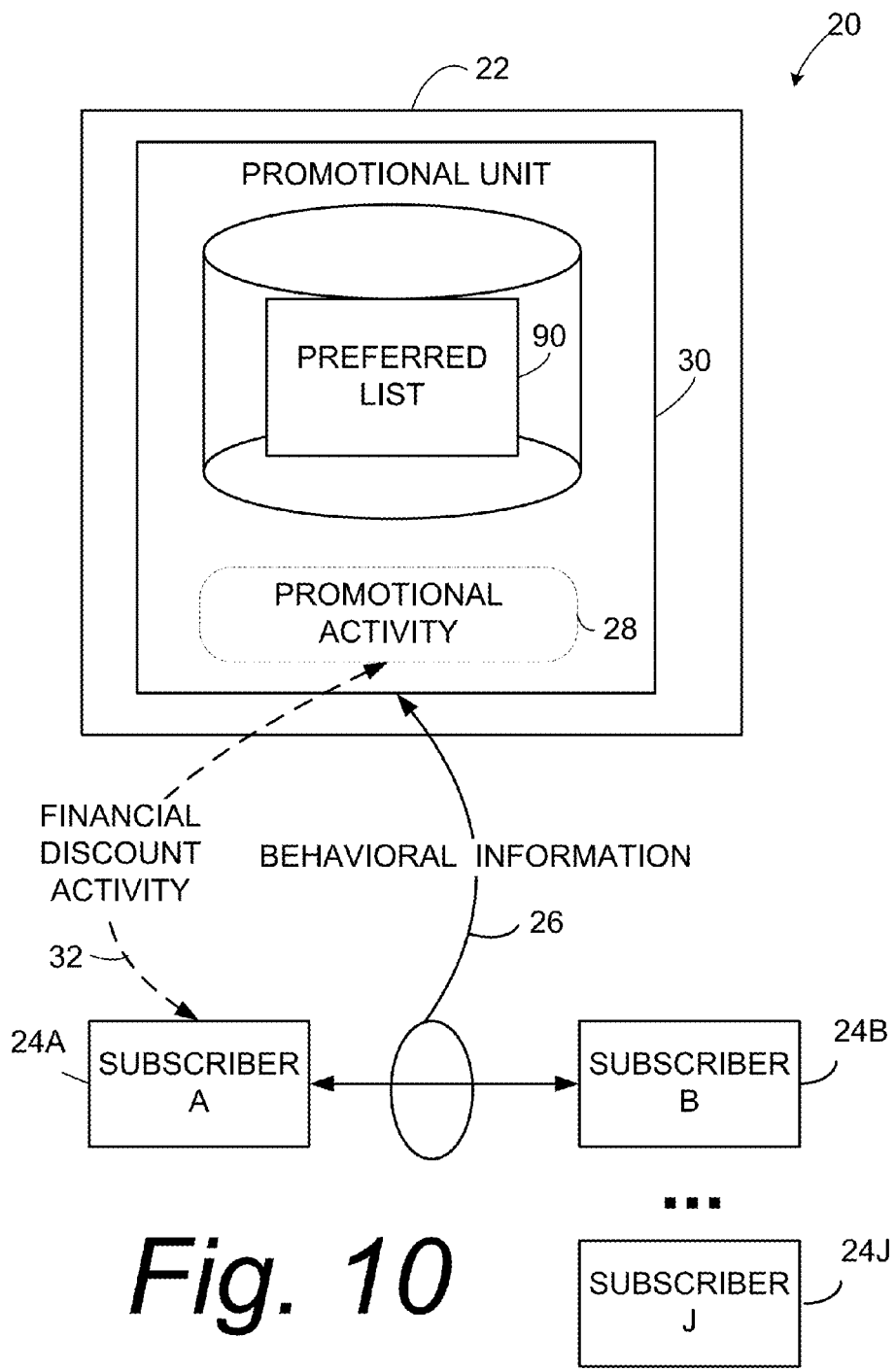
FIG. 10 is a diagrammatic view of an example embodiment of a communication system in which a promotional node maintains a preferred list of customers/subscribers for whom the customer/subscriber is afforded a preferential financial rate.

In some example embodiments generically depicted by FIG. 10, the promotional activity 28 comprises using the behavioral information 26 to modify a preferred list 90 of customers/subscribers for whom the customer/subscriber is afforded a preferential financial rate. The preferred list 90, which exists separately for each customer/subscriber (e.g., on a per subscriber basis so that each subscriber has his/her own preferred list), may take any of several different forms, including a fleet membership list or a "family and friends" (FaF) type list. In the example context of the "family and friends" (FaF) type service, the promotional activity 28 of the technology disclosed herein may be deemed to provide a dynamic family and friends (DFaF) service. Such a Dynamic Family and Friends (DFaF) service improves existing FaF functionality and makes it possible to dynamically update FaF lists based on subscriber or account usage.

As used herein, a promotional node 22 with a preferred list 90 is also referred to as a preferred list promotional node 22. Similarly, a promotional unit with a preferred list 90 is referred to as a preferred list promotional unit 30. Reference to preferred list promotional node 22 or preferred list promotional unit 30 is intended to encompass not only a DFaF type service, but any other type of service wherein a list of preferred other customers/subscribers is maintained for promotional purposes, including but not limited to fleet services. Further, reference to DFaF herein is for illustration purposes only and is not intended to confine the technology disclosed herein to a DFaF type service, as it is clear that other types of preferred list services are also encompassed.

Figures 10A, 10B:
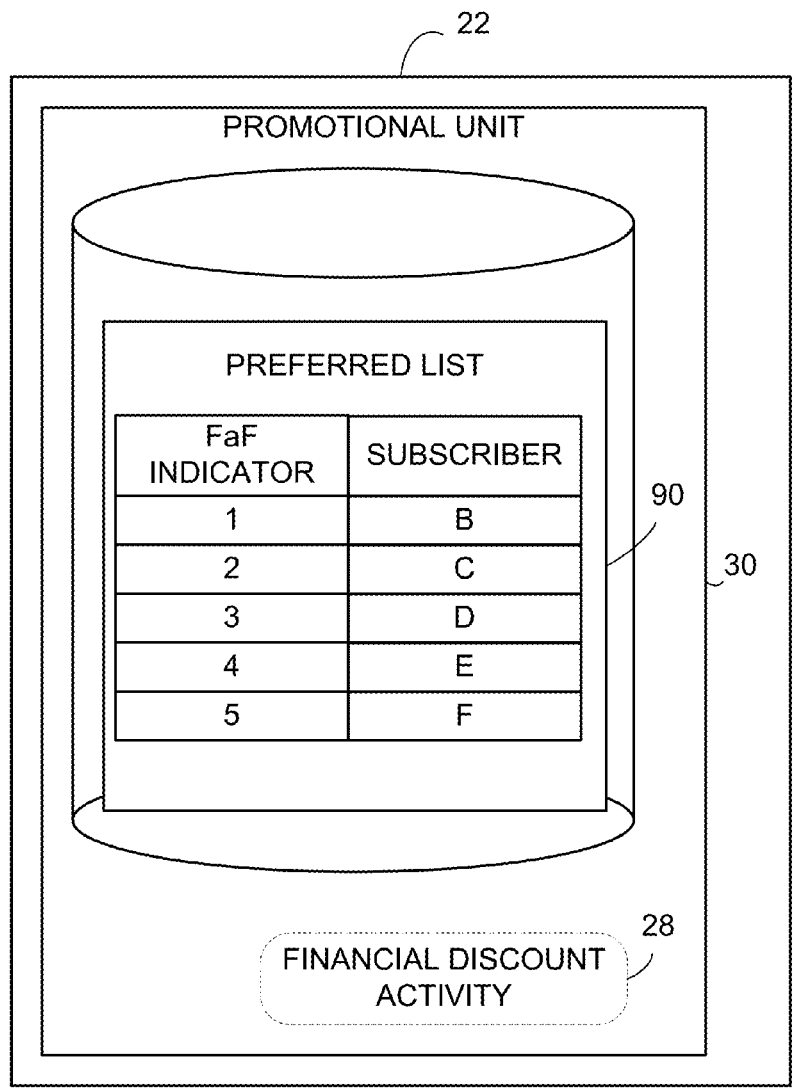
FIG. 10A is a diagrammatic view of an example embodiment of a promotional node which maintains, on a per subscriber basis, a multi-level preferred list of customers/subscribers and which shows an example ranking of other customer/subscribers.
FIG. 10B is a chart showing example discount values for call cases of an example scenario of the embodiment of FIG. 10A.

In the above regard, assume (as shown in FIG. 10A) that a subscriber 24A initially has five numbers in his/hers FaF list, i.e. subscribers B, C, D, E, F. In FIG. 10A, the preferred list is per subscriber, meaning that each subscriber has own individual list of preferred numbers. Position (ranking) of a subscriber in a FaF list is indicated with a FaF indicator. In FIG. 10A the FaF indicator is a value in the left column which corresponds to the other subscriber identified in the right column. The FaF Indicator of the left column is used to distinguish subscriber's ranking in a FaF list 90. Assume further that voice and short message service (SMS) traffic between subscriber A and subscribers B . . . D is discounted according to the operator's business logic and ranking in FaF list 90 according to the table of FIG. 10B, i.e. if customer/subscriber 24A calls customer/subscriber 24B, customer/subscriber 24A will receive a discount of 50%, but if customer/subscriber 24A calls customer/subscriber 24D, the discount for customer/subscriber 24A will be 30%.

As mentioned above, conventional FaF type services are static, and thus can only be changed with external intervention (customer care (CC) or Interactive Voice Response (IVR) system/office of the operator). Advantageously the technology disclosed herein provides a dynamic preferred list such as preferred list 90 illustrated in FIG. 10, e.g., a dynamic Family and Friends service where list of FaF numbers list is dynamically updated, based on behavioral information, e.g., information from a business intelligence system 72 and a set of criteria, as described herein.

In some example embodiments a standard FaF is already resident and a dynamic FaF (DFaF) functionality is further implemented to improve the existing FaF. Such can occur, for example, in a charging system comprising or connected to an appropriate node which can execute the dynamic FaF (e.g., dynamic preferred list 90) functionality, such as the promotional node 22 previously described. Remarks previously made with reference to, e.g., FIG. 1-FIG. 1C concerning the constituency and location of the promotional node 22 and its promotional unit 30, as well as the FIG. 2 comments relating to the nature of the promotional activity, are applicable to any embodiments of promotional node 22 which host the preferred list 90 in its various variations as herein described. For example, the promotional node 22 with preferred list 90 can be included in a charging system 34 or be external to the charging system 34, either as a separate, stand-alone node or in confederation with other elements/units.

Figure 11:
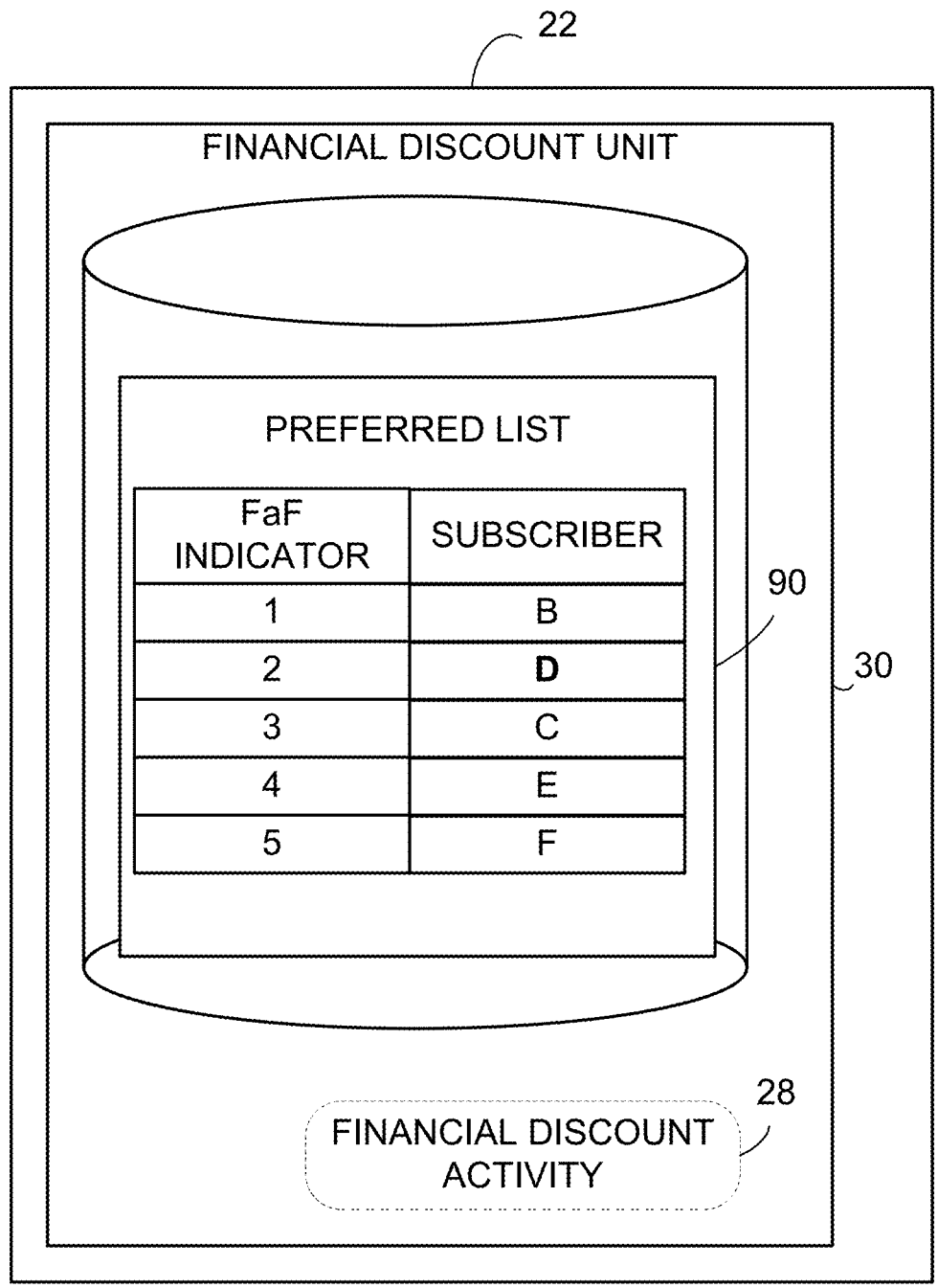
FIG. 11 is a diagrammatic view showing a change of ranking in the example ranking of the preferred list of FIG. 10A.

The preferred list promotional node 22 and its preferred list promotional unit 30 may work in conjunction with a business intelligence system 72, e.g., Analytics Suite. The business intelligence system 72 serves to store and analyze subscriber behavior, and relevant information can be retrieved from it, either on demand or on a regular basis. The preferred list promotional unit 30 (which executes or hosts the DFaF) extracts usage information (e.g., behavioral information 26) of subscriber 24A and analyzes the subscriber usage information. If the behavior of subscriber 24A changes and subscriber 24A starts to call subscriber 24D more often than previously, eventually the DFaF ranking of subscriber 24D will improve so that the preferred list 90 will appear like that of FIG. 11. In FIG. 11, note the promotion of customer/subscriber 24D in contrast to the preferred list of FIG. 10A. In such case subscriber 24A may receive a notification about the change and about new discounts valid for calls to subscriber 24D.

Furthermore, in an example embodiment the short number lists (e.g., speed dial lists) in subscriber 24A's mobile handset can be updated with B-number rankings above (e.g., updated to reflect the change in preferred list from FIG. 10A to FIG. 11, for example). Such updating of the short number lists in subscriber 24A's mobile handset makes it possible that the most numbers most frequently called by customer/subscriber 24A will always be available in the subscriber's mobile phone handsets, and in the short number lists in particular.

Figure 12:
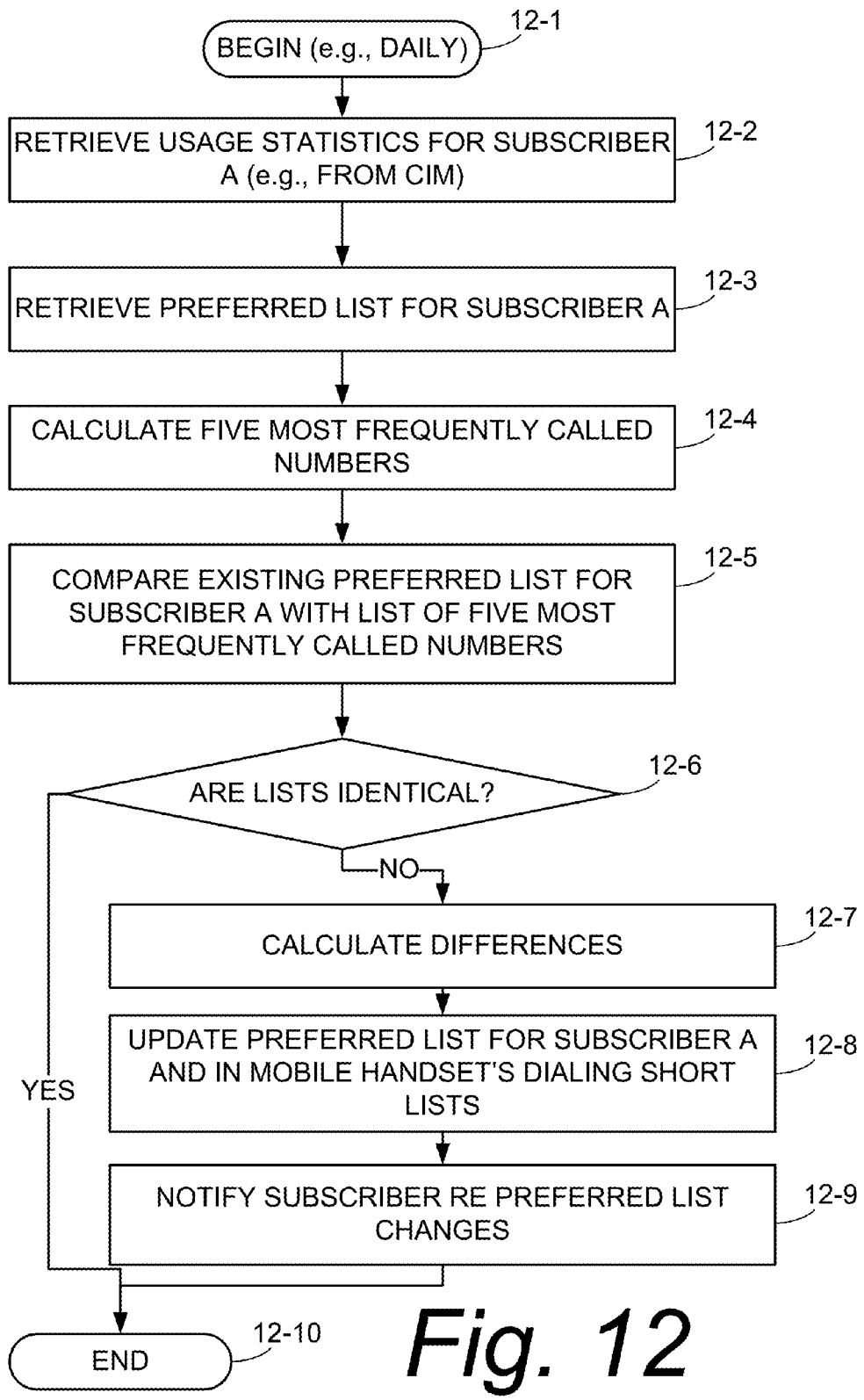
FIG. 12 is a flowchart showing example acts or steps preformed in conjunction with a method of maintaining a preferred list of customer/subscribers and performing a promotional activity according to an example embodiment of the technology disclosed herein.

The foregoing operation is reflected by example acts and steps illustrated in FIG. 12. Act 12-1 reflects beginning or initialization of a dynamic preferred list update and maintenance procedure performed by the preferred list promotional unit 30 of the preferred list promotional node 22. Such beginning and/or initialization can occur periodically, e.g., daily, or at any other interval or at operator command and/or subscriber request. Act 12-2 comprises retrieval of usage statistics for customer/subscriber 24A. As mentioned above, such usage statistics, also known as or included in behavioral information 26, may be obtained from business intelligence system 72. Act 12-3 comprises the dynamic preferred list update and maintenance procedure retrieving the preferred list 90 for customer/subscriber 24A. The preferred list 90 may be stored in memory 50 (see FIG. 1C). As an example, representative act, act 12-4 comprises the preferred list promotional unit 30 calculating or determining a predetermined number of subscriber numbers most frequently called by customer/subscriber 24A. For sake of illustration, five such most frequently called numbers are assumed to be determined. Act 12-5 comprises the preferred list promotional unit 30 comparing the existing preferred list 90 with the most frequently called numbers as determined at act 12-4. If the lists are identical (e.g., if the existing preferred list 90 is identical to the most frequently called numbers as determined at act 12-4), the dynamic preferred list update and maintenance procedure terminates as reflected by act 12-10. If the determination of act 12-6 is negative, acts 12-7 through 12-9 are executed. Act 12-7 comprises a calculation of the differences between the existing preferred list 90 and the most frequently called numbers as determined at act 12-4. Act 12-8 comprises updating the preferred list 90 for customer/subscriber 24A and in the short dialing list of the handset of customer/subscriber 24A so that the new preferred list 90 becomes the most frequently called numbers as determined at act 12-4. Act 12-9 comprises notifying the customer/subscriber 24A (e.g., by SMS or otherwise) that the preferred list 90 has been updated.

The existing FaF functionality allows more than one subscriber to have same FaF Indicator for a particular subscriber. Accordingly, in some example embodiments of the technology disclosed herein and as illustrated generically by FIG. 13, the preferred list may be configured to comprise plural levels of preference, each preference level being associated with a corresponding level of promotional benefit or promotional credit (e.g., financial discount), with the node 22 being configured to use behavioral information 26 regarding the customer/subscriber's communication with another customer/subscriber to automatically change a preference level on the preferred list for the other customer/subscriber. Again it is noted that the preferred, list, which comprising plural levels of preference, exists separately for each customer/subscriber (e.g., on a per subscriber basis so that each subscriber has his/her own preferred list). Moreover, in some example embodiments, the preferred list is configured to accommodate plural other customers/subscribers at at least one preference level.

Figure 13:
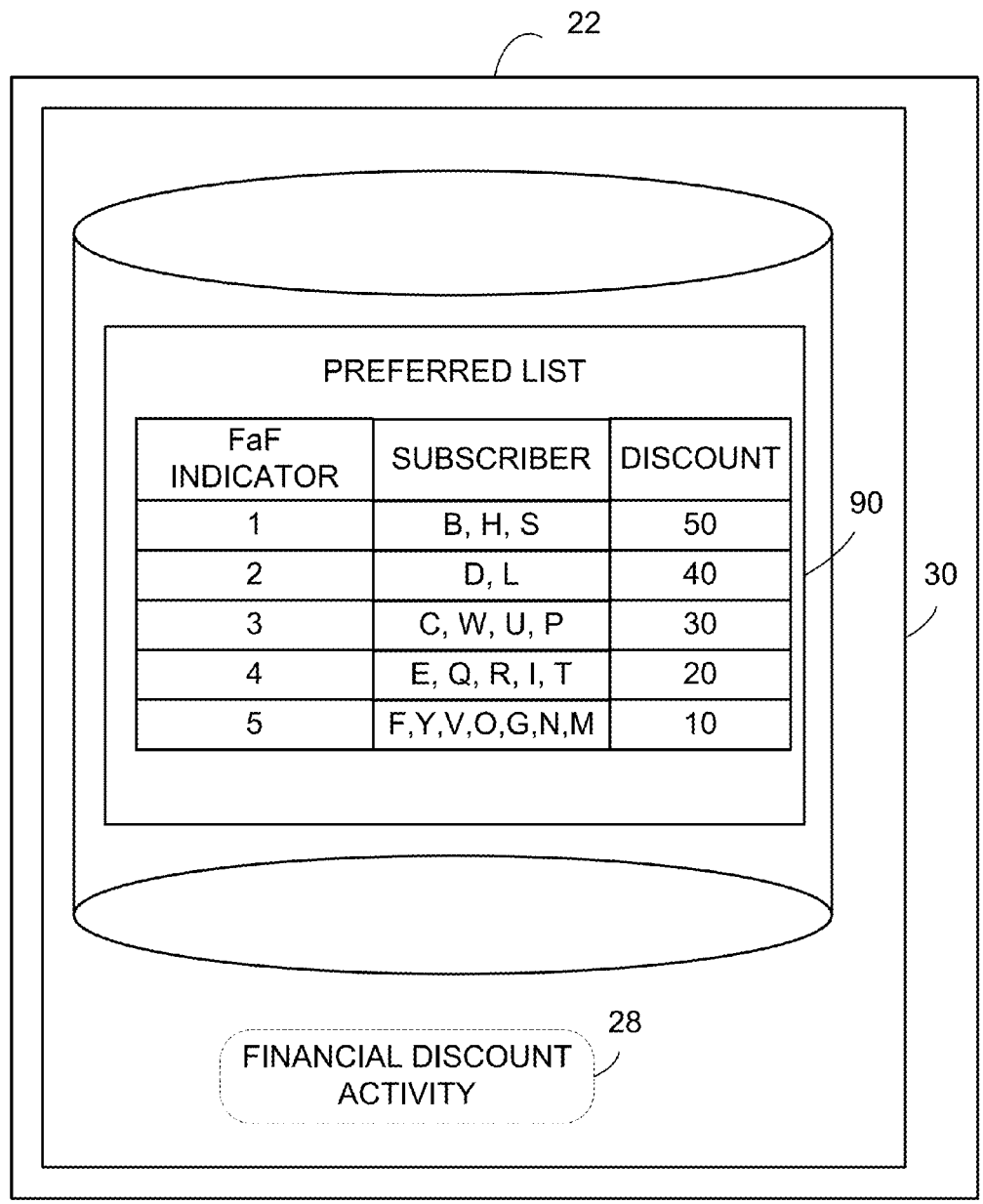
FIG. 13 is a diagrammatic view of an example embodiment of a communication system in which a promotional node maintains, on a per subscriber basis, a multi-level preferred list of customers/subscribers, and wherein one or more levels accommodate plural other customer/subscribers for whom the customer/subscriber is afforded a preferential financial rate.

An example scenario of a plural level of preference embodiment is illustrated in FIG. 13. In the FIG. 13 example an operator's business configuration is built in such a way that several subscribers may share same FaF Indicator. In FIG. 13, the left column is a FaF indicator for the plural subscribers listed in the corresponding row of the second column, with the third column of the corresponding row indicating a promotional value (e.g., discount value) associated with the FaF indicator. It will be recalled that, in the existing FaF feature, FaF rankings are determined and may be changed only by manual subscriber's or operator's intervention, but the technology disclosed herein allows for dynamic, automatic performance of promotional activity 28 and thus dynamic, automatic adjustment of the preferred list 90 by the preferred list promotional unit 30. In particular, the technology disclosed herein improves the existing behavior by adding real-time evaluation of service usage and dynamic update of FaF list, based on certain criteria, as shown in the example of FIG. 13. The service involved for the dynamic adjustable 90 may be voice, SMS, or simply a monetary value spent in a certain time frame.

Regarding the FIG. 13 example scenario, assume that DFaF logic is set up as follows:
Ranking time frame: 30 days (meaning that usage will be calculated in a timeframe of one month)
De-ranking time frame: 30 days (meaning that a subscriber may keep his/hers rank in a FaF list for one month. After that time has expired, ranking will be decreased to the next lower rank. This counter is reset at each rank change)
Usage units: EUR (meaning that ranking will be based on monetary value spent on all services originated from subscriber 24A and between subscriber 24A and other subscribers. This may also be i.e. number of SMS, time in call, etc., originating and terminating by subscriber 24A)
Ranking Notification Threshold: −2 (threshold when a notification will be sent to subscriber 24A that one of his/hers frequently called contacts getting close to new FaF rank. Such a notification message may indicate, for example: "If you call subscriber 24C for 2 more EUR in next 30 days, you will receive 30 days of 40% discount to calls to that subscriber")
Qualifying amount: as shown in FIG. 14.

Traffic is ongoing, and usage statistics of subscriber 24A has accumulated in business intelligence system 72. Assume further that, after a while, the Dynamic FaF application (e.g., the dynamic preferred list update and maintenance procedure performed by preferred list promotional unit 30) has built up a ranking in the FaF list for subscriber 24A in the Charging System 34 (information retrieved from business intelligence system 72) as illustrated in FIG. 15. Assume further that subscriber 24A has called subscriber 24C for 38 EUR in the period of last 30 days, and that subscriber 24B has been promoted to FaF Rank 1 exactly 30 days ago. The DFaF logic (e.g., the dynamic preferred list update and maintenance procedure) retrieves usage statistics from business intelligence system 72 and detects subscriber 24A as a promotion candidate (since he/she is within ranking notification threshold below qualifying amount for next FaF rank) and sends a notification to subscriber 24A. Such notification may essentially state as follows: "If you call subscriber 24C for 2 more EUR in next 30 days, you will receive 30 days of 40% discount to calls to that subscriber". Since subscriber 24B has not advanced in FaF hierarchy in last 30 days (de-ranking time frame), his/hers rank will be decreased to 2.

Figure 16:
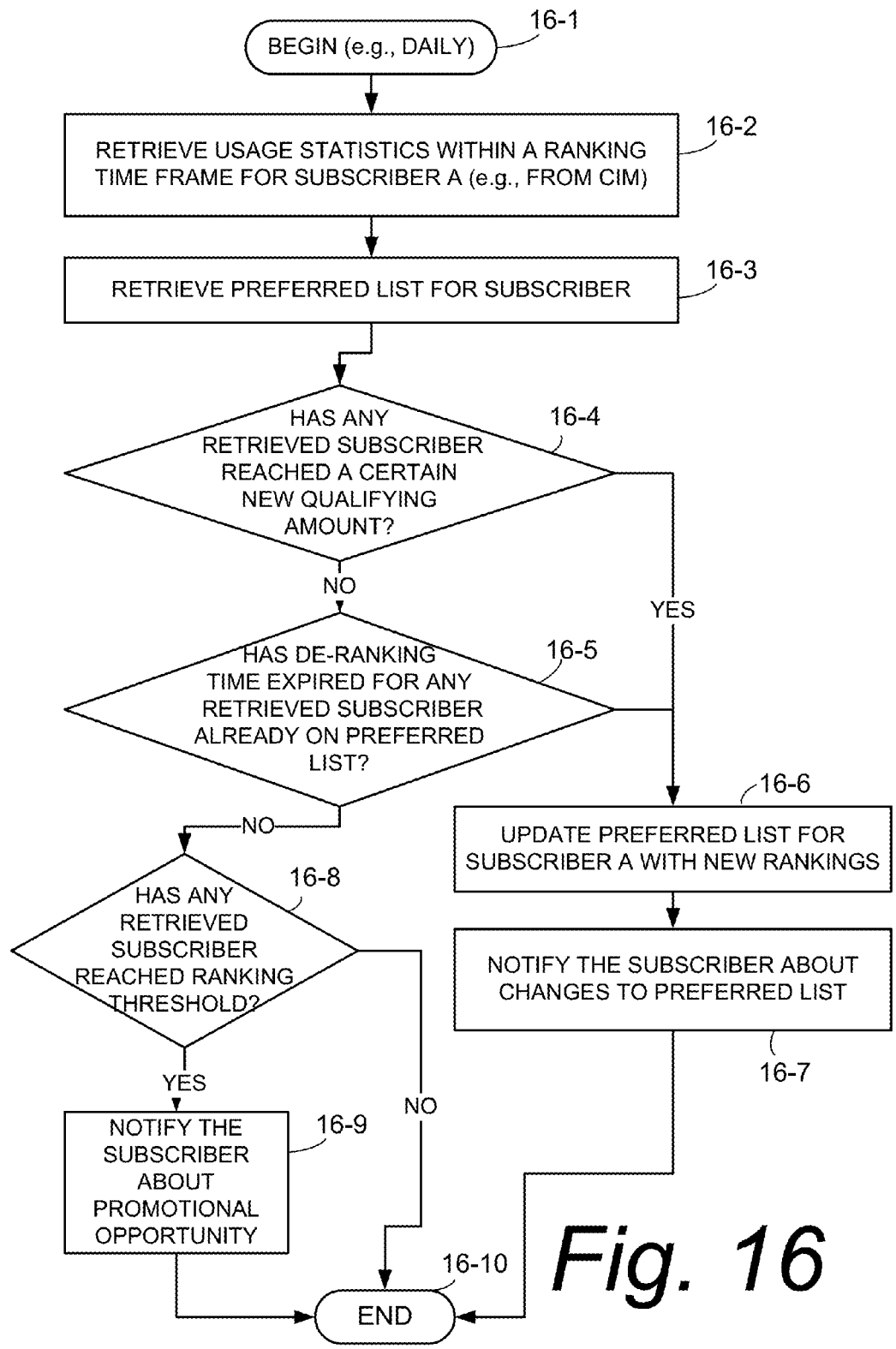
FIG. 16 is a flowchart showing example acts or steps preformed in conjunction with a method of maintaining a preferred list of customer/subscribers and performing a promotional activity according to another example embodiment of the technology disclosed herein.

FIG. 16 shows example, representative acts or steps comprising a dynamic preferred list update and maintenance procedure of the type illustrated by the scenarios of FIG. 13-FIG. 15. Act 16-1 reflects beginning or initialization of a dynamic preferred list update and maintenance procedure performed by the preferred list promotional unit 30 of the preferred list promotional node 22. Such beginning and/or initialization can occur periodically, e.g., daily, or at any other interval or at operator command and/or subscriber request. Act 16-2 comprises retrieval of usage statistics within a ranking time frame for customer/subscriber 24A. As mentioned above, such usage statistics, also known as or included in behavioral information 26, may be obtained from business intelligence system 72. Act 16-3 comprises the dynamic preferred list update and maintenance procedure retrieving the preferred list 90 for customer/subscriber 24A. The preferred list 90 may be stored in memory 50 (see FIG. 1C). As an example, representative act, act 16-4 comprises the preferred list promotional unit 30 determining whether any of the retrieved subscribers has reached a certain new qualifying amount.

If the determination of act 16-4 is positive, act 16-6 and act 16-7 are executed prior to termination of the dynamic preferred list update and maintenance procedure as act 16-10. Act 16-6 comprises updating the preferred list 90 for customer/subscriber 24A with new rankings (e.g., new FaF rankings). Act 16-7 comprises notifying the customer/subscriber 24A about the changes to the customer/subscriber's 24A preferred list 90.

If the determination of act 16-4 is negative, act 16-5 is performed. Act 16-5 involves the dynamic preferred list update and maintenance procedure determining whether the de-ranking time has expired for any of the customers/subscribers that are already listed in the preferred list 90 for customer/subscriber 24A. If the determination of act 16-5 is affirmative, act 16-8 and act 16-9 are executed prior to termination of the dynamic preferred list update and maintenance procedure as act 16-10. Act 16-8 comprises the dynamic preferred list update and maintenance procedure determining whether any of the retrieved subscribers have reached a ranking threshold. If the determination of act 16-8 is negative, the dynamic preferred list update and maintenance procedure terminates (act 16-10). If the determination of act 16-8 is positive, as act 16-9 the dynamic preferred list update and maintenance procedure causes a notification of the promotional opportunity (e.g., discount opportunity) to be sent to customer/subscriber 24A before the dynamic preferred list update and maintenance procedure terminates (act 12-10).

Thus, as illustrated by examples of FIG. 13-FIG. 16, in some example embodiments the preferred list promotional unit 30 of preferred list promotional node 22 maintains the preferred list by allowing the other customer/subscriber to remain at a current preference level on the preferred list for a first period of time. Upon expiration of the first period of time, the preferred list promotional unit 30 selectively demotes or promotes the other customer/subscriber to another preference level (as illustrated by a positive determination of act 16-7 of FIG. 16). Moreover, in some example embodiments, the preferred list promotional unit 30 of preferred list promotional node 22 maintains the preferred list by providing a notification to the customer/subscriber and/or the other customer/subscriber when the amount of the communication usage between the customer/subscriber and the other customer/subscriber approaches a threshold value associated with a particular preference level.

Figure 17:
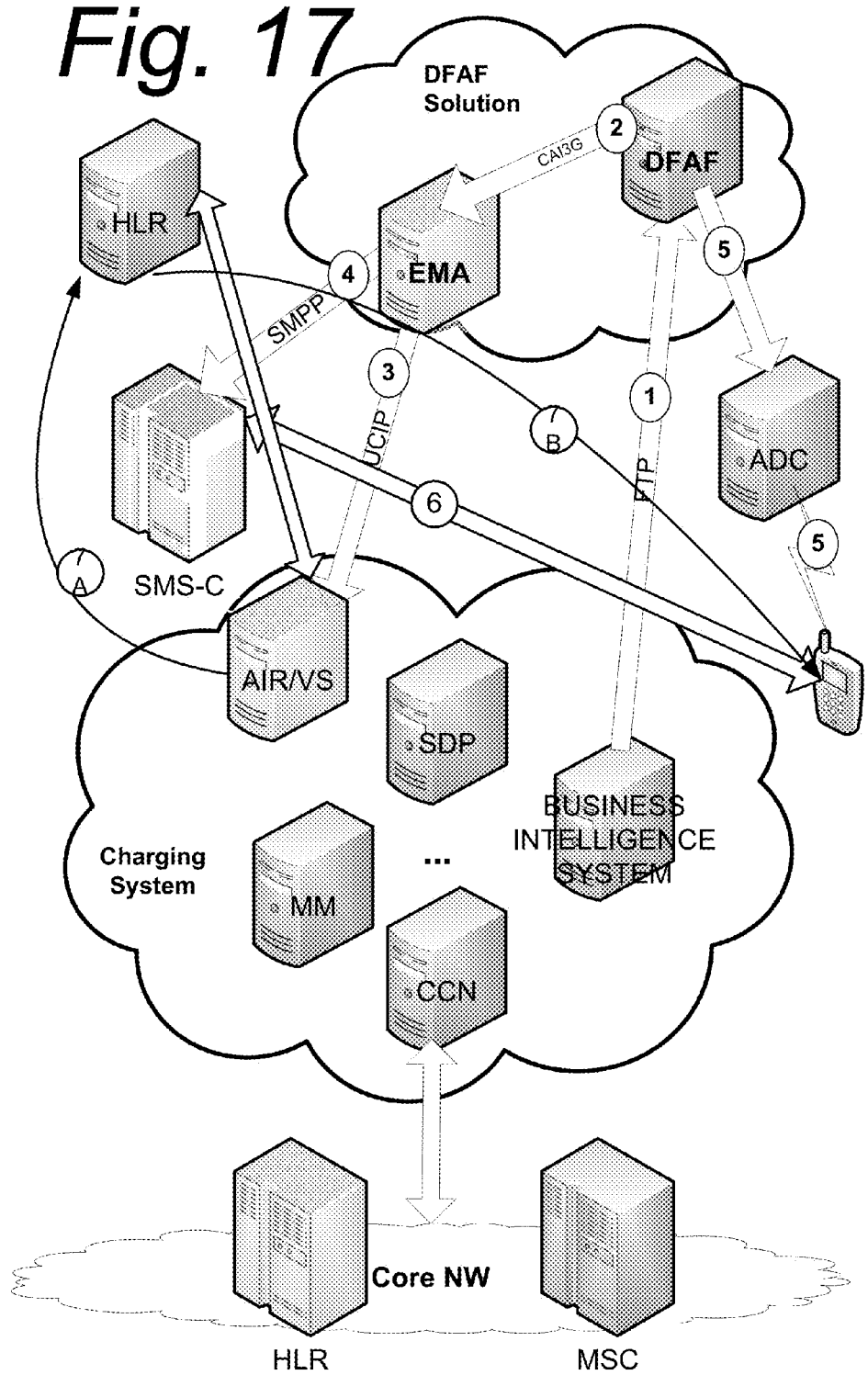
FIG. 17 is a diagrammatic view showing connection of a promotional node to other network elements/nodes according to another example embodiment.

The foregoing tracking and calculation of the dynamic preferred list 90 may be implemented in a charging system 34 or an external application which updates already existing FaF indicators in the charging system. As mentioned above, the usage information (e.g., behavioral information 26) may be retrieved from the business intelligence system 72. FIG. 17 shows as act 1 the business intelligence system 72 sending relevant information to a node (e.g., preferred list promotional node 22) which contains and executes the dynamic preferred list update and maintenance procedure. The relevant information in this case can be all calls generated from customer/subscriber 24A in a given time frame. Step 2 of FIG. 17 comprises the dynamic preferred list update and maintenance procedure determining/calculating which subscribers should be added/deleted from the preferred list 90 for customer/subscriber 24A, and sending the results of such determination/calculation to a multi-activation section or unit (EMA). The multi-activation unit (EMA) contains provisioning logic, and as step 3 of FIG. 17 determines or calculates which node(s) should be updated with new preferred list rules (e.g., new FaF rules). Step 4 of FIG. 17 comprises sending a notification to customer/subscriber 24A regarding the recent changes in the preferred list 90 (e.g., in the subscriber's FaF). Step 5 of FIG. 17 comprises updating the short number dial lists in the affected subscriber's mobile handset.

Other units/elements shown in FIG. 17 are an Account Information and Refill (AIR) unit (used for usts messages); cost control node (CCN), multi-mediation node (MM), service data point (SDP), voucher service (VS), and consumer information management (CIM) node, which can be an example of a business intelligence system 72. The Automatic Device Configuration (ADC) is a unit or machine that pushes configuration into the handset.

There are two ways of notification from the charging system 34. Notifications can occur either using a short message service (SMS) or Unstructured Supplementary Service Data (USSD). One way of sending a notification message to the subscriber is depicted by arrow 6 in FIG. 17, e.g., the sending of a notification from the SMS-C ultimately to the subscriber. A second way of sending a notification is depicted by arrows 7A and 7B in FIG. 17, which involves the AIR communicating (as step 7A) with a home location register (HLR) for the subscriber and the HRL then communicating (as step 7B) with the subscriber, such communication with the subscriber possibly being through other intermediate nodes and, where appropriate, the radio access network (RAN).

The technology described herein concerning the automated and dynamic preferred list promotion has numerous advantages. For example, one advantage of automated preferred list updating solution is dynamic administration of the preferred list 90, based on subscribers' behavior. The automated preferred list updating solution closes down any gaps between the business intelligence system 72 (which gathers usage statistics) and/or the charging system 34, which handles business logic (such as charging and discounting), and end-user. The example embodiments have a benefit of quick and dynamic administering of a preferred list without a need of customer and/or operator's involvement. Further, the technology disclosed herein facilitates and enhances marketing campaigns where end-users have an incentive (discount) if they use their mobile services more and often.

Various expressions and calculations as described above should be understood merely to be non-exhaustive, non-limiting, illustrative examples of how marketing promotions can be targeted. Other approaches (e.g., other expressions and calculations) can be utilized and/or applied.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node of a communications system configured to use behavioral information regarding a customer/subscriber's communication usage to automatically perform a promotional activity with respect to communication usages of the customer/subscriber with another customer/subscriber;
    wherein the behavioral information reflects:
        symmetry of connection of the customer/subscriber with the another customer/subscriber; and
        community similarity of the customer/subscriber and another customer/subscriber.

2. The node of claim 1, wherein the node comprises electronic circuitry configured to use the behavioral information regarding the customer/subscriber's communication usage to automatically perform the promotional activity with respect to the communication usages of the customer/subscriber with the another customer/subscriber.

3. The node of claim 1, wherein the promotional activity comprises at least one of:
    a financial discount activity;
    a new access activity;
    a quality of service change activity;
    an advance recharge activity.

4. The node of claim 3, wherein the promotional activity is at least one of:
    providing a financial discount; and
    modifying a financial discount.

5. The node of claim 1, wherein the node performs the promotional activity depending on whether or not the behavioral information indicates that the customer/subscriber and the another customer/subscriber initiate connections to each other substantially equally.

6. The node of claim 1, wherein the node is configured to use the behavioral information to predict a future persistence of communications between the customer/subscriber and the another customer/subscriber.

7. The node of claim 1, wherein the community similarity depends on a number of common neighbors of the customer/subscriber and the another customer/subscriber and the number of neighbors of the customer/subscriber.

8. The node of claim 1, wherein the node is configured to determine a promotional value $D_B$ for communication usages of the customer/subscriber relative to the another customer/subscriber, the promotional value $D_B$ being determined according to the expression:

$$D_B = (S_{AB} + C_{AB}) * W'_{AB}$$

in which:

S$_{AB}$ is a symmetry of connection value of the customer/subscriber with another customer/subscriber;

C$_{AB}$ is a community similarity value of the customer/subscriber and another customer/subscriber; and W'$_{AB}$ is a normalized value of a number of connections initiated by the customer/subscriber to the another customer/subscriber.

9. The node of claim 8, wherein the symmetry of connection value S$_{AB}$ is determined by the expression S$_{AB}$=minimum (W$_{AB}$,W$_{BA}$)/(W$_{AB}$+W$_{BA}$), wherein W$_{AB}$ is the number of connections initiated by the customer/subscriber to the another customer/subscriber and W$_{BA\ (Original)}$ is a number of connections initiated by the another customer/subscriber to the customer/subscriber.

10. The node of claim 8, wherein the community similarity value is determined by the expression C$_{AB}$=(1+N$_{AB}$)/N$_A$, where N$_{AB}$ is a number of common neighbors of the customer/subscriber and the another customer/subscriber and N$_A$ is the number of neighbors of the customer/subscriber.

11. The node of claim 8, wherein the node is configured to re-evaluate the promotional value D$_B$ periodically, and wherein upon each re-evaluation the node causes the customer/subscriber to be informed of results of the re-evaluation.

12. A node of a communications system configured to use behavioral information regarding a customers/subscriber's communication usage to automatically perform a promotional activity with respect to communication usages of the customer/subscriber with another customer/subscriber;

wherein the promotional activity comprises using the behavioral information to modify a preferred list of customers/subscribers for whom the customer/subscriber is afforded a preferential status.

13. The node of claim 12, wherein the preferred list is configured to comprise plural levels of preference, each preference level being associated with a corresponding level of promotional benefit, and wherein the node is configured to use behavioral information regarding the customer/subscriber's communication with another customer/subscriber to automatically change a preference level on the preferred list for the another customer/subscriber.

14. The node of claim 13, wherein the preferred list is configured to accommodate plural other customers/subscribers at at least one preference level.

15. The node of claim 13, wherein the node maintains the preferred list by:

allowing the another customer/subscriber to remain at a current preference level on the preferred list for a first period of time; and upon expiration of the first period of time; and selectively demoting or promoting the another customer/subscriber to another preference level.

16. The node of claim 13, wherein the node maintains the preferred list by providing a notification to the customer/subscriber and/or the another customer/subscriber when the amount of the communication usage between the customer/subscriber and the another customer/subscriber approaches a threshold value associated with a particular preference level.

17. The node of claim 12, wherein the node comprises electronic circuitry configured to use the behavioral information regarding the customer/subscriber's communication usage to automatically perform the promotional activity with respect to the communication usages of the customer/subscriber with the another customer/subscriber.

18. The node of claim 12, wherein the promotional activity comprises at least one of:

a financial discount activity;
a new access activity;
a quality of service change activity;
an advance recharge activity.

19. The node of claim 18, wherein the promotional activity is at least one of:

providing a financial discount; and
modifying a financial discount.

20. The node of claim 12, wherein the node performs the promotional activity depending on whether or not the behavioral information indicates that the customer/subscriber and the another customer/subscriber initiate connections to each other substantially equally.

21. The node of claim 12, wherein the node performs the promotional activity depending on whether or not the behavioral information indicates that the customer/subscriber and the another customer/subscriber belong to a same community.

22. The node of claim 12, wherein the node is configured to use the behavioral information to predict a future persistence of communications between the customer/subscriber and the another customer/subscriber.

23. A method of operating a communications system comprising:

obtaining behavioral information regarding a customer/subscriber's communication usage; and using the behavioral information to automatically perform a promotional activity with respect to communication usages of the customer/subscriber with another customer/subscriber;

wherein the behavioral information reflects:

symmetry of connection of the customer/subscriber with the another customer/subscriber; and community similarity of the customer/subscriber and another customer/subscriber.

24. The method of claim 23, wherein the method further comprises using electronic circuitry to automatically perform the promotional activity with respect to the communication usages of the customer/subscriber with the another customer/subscriber.

25. The method of claim 23, wherein the promotional activity comprises at least one of:

a financial discount activity;
a new access activity;
a quality of service change activity;
an advance recharge activity.

26. The node of claim 25, wherein the promotional activity is at least one of:

providing a financial discount; and
modifying a financial discount.

27. The method of claim 23, further comprising performing the promotional activity depending on whether or not the behavioral information indicates that the customer/subscriber and the another customer/subscriber initiate connections to each other substantially equally.

28. The method of claim 23, further comprising using the behavioral information to predict a future persistence of communications between the customer/subscriber and the another customer/subscriber.

29. The method of claim 23, wherein the community similarity depends on a number of common neighbors of the customer/subscriber and the another customer/subscriber and the number of neighbors of the customer/subscriber.

30. The method of claim 23, further comprising determining a promotional value D$_B$ for communication usages of the customer/subscriber relative to the another customer/subscriber, the promotional value $D_B$ being determined according to the expression:

$$D_B = (S_{AB} + C_{AB}) * W'_{AB}$$

in which:
$S_{AB}$ is a symmetry of connection value of the customer/subscriber with another customer/subscriber;
$C_{AB}$ is a community similarity value of the customer/subscriber and another customer/subscriber; and
$W'_{AB}$ is a normalized value of a number of connections initiated by the customer/subscriber to the another customer/subscriber.

31. The method of claim 30, wherein the symmetry of connection value $S_{AB}$ is determined by the expression $S_{AB} = \text{minimum}(W_{AB}/W_{BA})/(W_{AB}+W_{BA})$/wherein $W_{AB}$ is the number of connections initiated by the customer/subscriber to the another customer/subscriber and $W_{BA}$ is a number of connections initiated by the another customer/subscriber to the customer/subscriber.

32. The method of claim 30, further comprising determining the community similarity value by the expression $C_{AB}$ $(=1+N_{AB})/N_A$, where $N_{AB}$ is a number of common neighbors of the customer/subscriber and the another customer/subscriber and $N_A$ is the number of neighbors of the customer/subscriber.

33. The method of claim 30, further comprising re-evaluating the discount value $D_B$ periodically, and wherein upon each re-evaluation informing the customer/subscriber of results of the re-evaluation.

34. A method of operating a communications system comprising:
obtaining behavioral information regarding a customer/subscriber's communication usage; and
using the behavioral information to automatically perform a promotional activity with respect to communication usages of the customer/subscriber with another customer/subscriber;
wherein the promotional activity comprises using the behavioral information to modify a preferred list of customers/subscribers for whom the customer/subscriber is afforded a preferential benefit.

35. The method of claim 34, wherein the preferred list is configured to comprise plural levels of preference, each preference level being associated with a corresponding level of promotional benefit, and further comprising using the behavioral information regarding the customer/subscriber's communication with another customer/subscriber to automatically change a preference level on the preferred list for the another customer/subscriber.

36. The method of claim 35, further comprising structuring the preferred list to accommodate plural other customers/subscribers at least one preference level.

37. The method of claim 35, further comprising:
allowing the another customer/subscriber to remain at a current preference level on the preferred list for a first period of time; and upon expiration of the first period of time,
selectively demoting or promoting the another customer/subscriber to another preference level.

38. The method of claim 35, further comprising providing a notification to the customer/subscriber and/or the another customer/subscriber when the amount of the communication usage between the customer/subscriber and the another customer/subscriber approaches a threshold value associated with a particular preference level.

39. The method of claim 34, wherein the method further comprises using electronic circuitry to automatically perform the promotional activity with respect to the communication usages of the customer/subscriber with the another customer/subscriber.

40. The method of claim 34, wherein the promotional activity comprises at least one of:
a financial discount activity;
a new access activity;
a quality of service change activity;
an advance recharge activity.

41. The node of claim 40, wherein the promotional activity is at least one of:
providing a financial discount; and
modifying a financial discount.

42. The method of claim 34, further comprising performing the promotional activity depending on whether or not the behavioral information indicates that the customer/subscriber and the another customer/subscriber initiate connections to each other substantially equally.

43. The method of claim 34, further comprising performing the promotional activity depending on whether or not the behavioral information indicates that the customer/subscriber and the another customer/subscriber belong to a same community.

44. The method of claim 34, further comprising using the behavioral information to predict a future persistence of communications between the customer/subscriber and the another customer/subscriber.

* * * * *